(12) United States Patent
Kimura et al.

(10) Patent No.: US 10,227,022 B2
(45) Date of Patent: Mar. 12, 2019

(54) TILT ARM FOR SEAT AND VEHICLE SEAT

(71) Applicant: TOYOTA BOSHOKU KABUSHIKI KAISHA, Aichi (JP)

(72) Inventors: Masahide Kimura, Novi, MI (US); Yushi Shinozaki, Aichi (JP); Shota Nonoyama, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/705,836

(22) Filed: Sep. 15, 2017

(65) Prior Publication Data

US 2018/0079327 A1 Mar. 22, 2018

(30) Foreign Application Priority Data

Sep. 20, 2016 (JP) .................... 2016-183270
Sep. 20, 2016 (JP) .................... 2016-183271
Sep. 20, 2016 (JP) .................... 2016-183272

(51) Int. Cl.
*B60N 2/02* (2006.01)
*B60N 2/62* (2006.01)
*B60N 2/18* (2006.01)
*B60N 2/28* (2006.01)

(52) U.S. Cl.
CPC ......... *B60N 2/1835* (2013.01); *B60N 2/1857* (2013.01); *B60N 2/2893* (2013.01)

(58) Field of Classification Search
CPC ... B60N 2/1835; B60N 2/1857; B60N 2/2893
USPC .................................................. 297/284.11
See application file for complete search history.

(56) References Cited

U.S. PATENT DOCUMENTS

| 4,753,479 | A | * | 6/1988 | Hatsutta | ............... | B60N 2/1842 |
| | | | | | | 297/284.11 |
| 4,883,318 | A | * | 11/1989 | Adachi | .................. | A47C 7/022 |
| | | | | | | 297/284.11 |
| 5,599,062 | A | * | 2/1997 | Hagedorn | .............. | B60N 2/914 |
| | | | | | | 297/284.11 |
| 6,386,633 | B1 | * | 5/2002 | Newton | .................. | B60N 2/62 |
| | | | | | | 297/284.11 X |

(Continued)

FOREIGN PATENT DOCUMENTS

| JP | 11-5473 | 1/1999 |
| JP | 2009-179192 | 8/2009 |

(Continued)

*Primary Examiner* — Rodney B White
(74) *Attorney, Agent, or Firm* — Greenblum & Bernstein, P.L.C.

(57) ABSTRACT

Provided is a tilt arm for a seat that is applied to a vehicle seat and that moves in a pivoting manner when changing an angle of inclination of a front end portion of a cushion pad. The tilt arm includes a coupling arm portion pivotably coupled to a side frame of a cushion frame, and a leading-end-side arm portion coupled and fixed to a leading end portion of the coupling arm portion. A sectional shape of a fixed portion, where the coupling arm portion and the leading-end-side arm portion are coupled and fixed to each other, is a closed sectional shape formed by a closed curve. A sectional shape of the coupling arm portion at the fixed portion and a sectional shape of the leading-end-side arm portion at the fixed portion are each an open sectional shape that is partially opened.

17 Claims, 15 Drawing Sheets

(56) References Cited

U.S. PATENT DOCUMENTS

| | | | | |
|---|---|---|---|---|
| 6,402,245 B1* | 6/2002 | Newton | ............. | B60N 2/62 |
| | | | | 297/284.11 |
| 6,739,658 B2* | 5/2004 | Pedronno | ............. | B60N 2/42745 |
| | | | | 297/284.11 X |
| 6,837,540 B2* | 1/2005 | Yamaguchi | ............. | B60N 2/4221 |
| | | | | 297/284.11 X |
| 6,908,149 B1* | 6/2005 | Yamaguchi | ............. | B60N 2/4221 |
| | | | | 297/284.11 X |
| 7,416,256 B2* | 8/2008 | Fujita | ............. | B60N 2/502 |
| | | | | 297/284.11 X |
| 8,016,355 B2 | 9/2011 | Ito et al. | | |
| 8,366,194 B2* | 2/2013 | Yamamoto | ............. | B60N 2/0232 |
| | | | | 297/284.11 |
| 8,408,646 B2* | 4/2013 | Harper | ............. | B60N 2/02 |
| | | | | 297/284.11 |
| 2001/0022460 A1* | 9/2001 | Kondo | ............. | B60N 2/1839 |
| | | | | 297/284.11 |
| 2007/0108817 A1* | 5/2007 | Lee | ............. | B60N 2/62 |
| | | | | 297/284.11 |
| 2009/0195041 A1 | 8/2009 | Ito et al. | | |
| 2015/0090855 A1 | 4/2015 | Arakawa et al. | | |
| 2015/0258914 A1* | 9/2015 | Lee | ............. | B60N 2/0284 |
| | | | | 297/284.11 |

FOREIGN PATENT DOCUMENTS

| | | |
|---|---|---|
| JP | 2014-159288 | 9/2014 |
| JP | 2015-67142 | 4/2015 |

\* cited by examiner

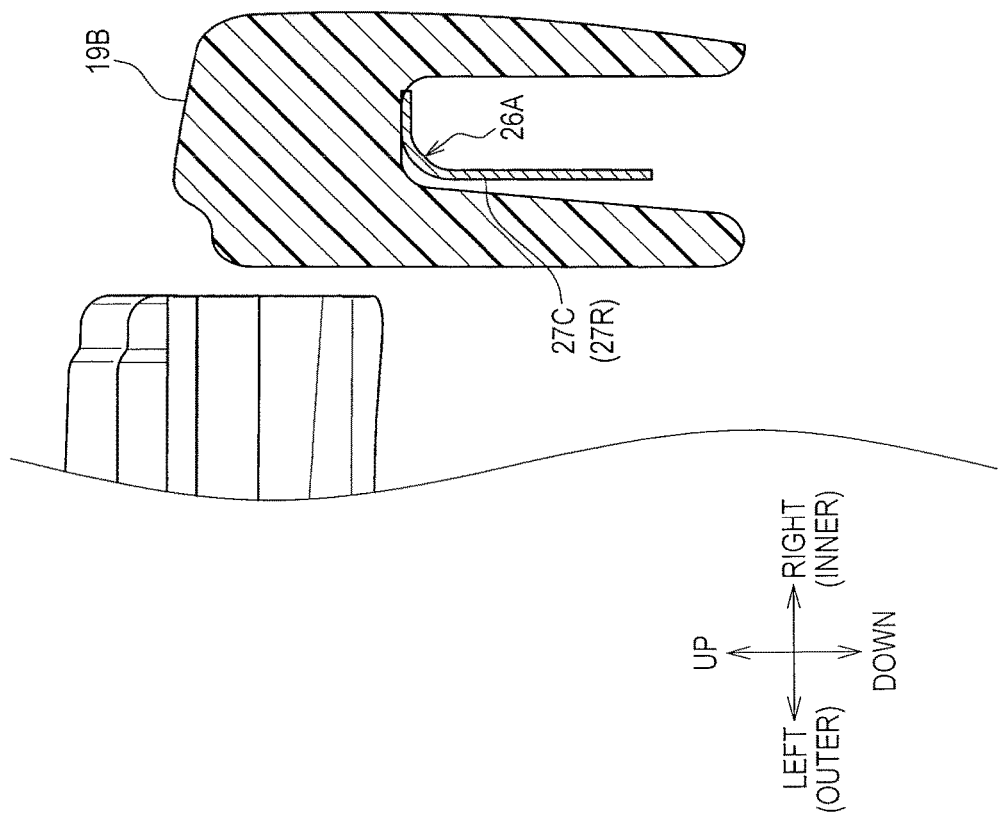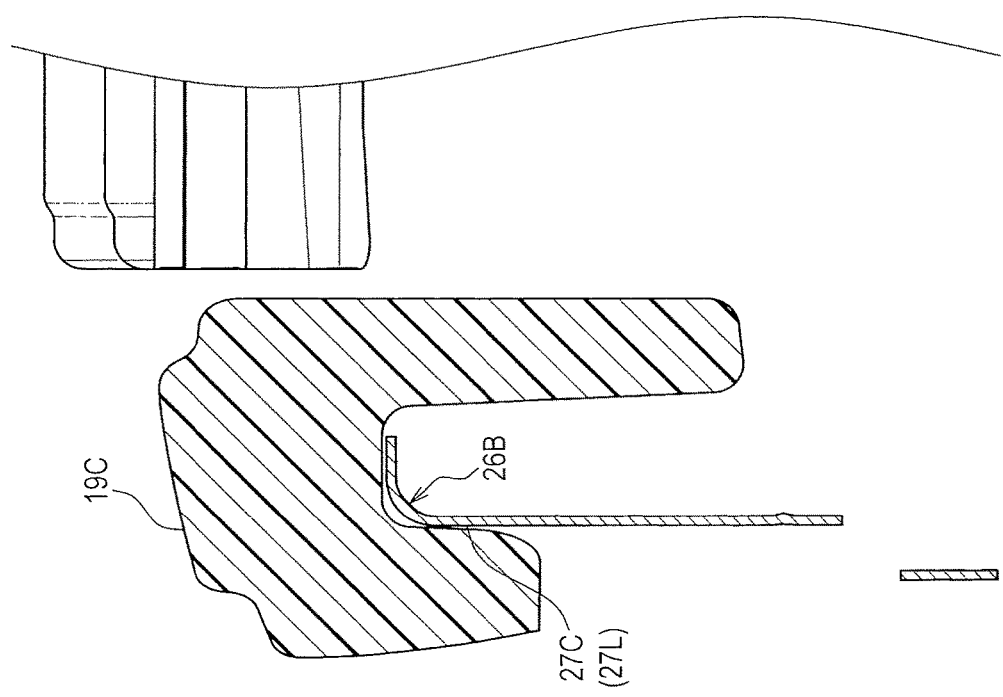
FIG. 12

TILT ARM FOR SEAT AND VEHICLE SEAT

CROSS-REFERENCE TO RELATED APPLICATIONS

This application claims the benefits of Japanese Patent Application No. 2016-183272 filed on Sep. 20, 2016 with the Japan Patent Office, Japanese Patent Application No. 2016-183270 filed on Sep. 20, 2016 with the Japan Patent Office, and Japanese Patent Application No. 2016-183271 filed on Sep. 20, 2016 with the Japan Patent Office, the entire disclosures of which are incorporated herein by reference.

BACKGROUND

The present disclosure relates to a tilt arm for use in a seat for a vehicle, such as a motor vehicle, a railway vehicle, a ship, or an aircraft.

As described in Japanese Unexamined Patent Application Publication No. 2014-159288, the tilt arm is an arm member that supports a cushion pad together with a side frame, such as a lower arm. The tilt arm is an arm member that is pivotably coupled to the side frame so as to move in a pivoting manner when changing an angle of inclination of a front end portion of the cushion pad.

SUMMARY

General tilt arms are formed by applying press working to metal plate material. Thus, in a case where the tilt arm has a relatively simple shape as described in the above-described publication, the entire tilt arm can be easily formed from a single sheet of plate material by press working.

That is, in the case where the tilt arm has a relatively simple shape, the entire tilt arm can be integrally formed. However, in a case where the tilt arm has a complex shape, it is difficult to integrally form the entire tilt arm.

In view of the above-described point, in one aspect of the present disclosure, it is desired to provide a tilt arm that can be formed relatively easily regardless of the complexity of its shape.

The present disclosure provides a tilt arm for a seat to be applied to a vehicle seat. The tilt arm supports a cushion pad together with a cushion frame and moves in a pivoting manner when changing an angle of inclination of a front end portion of the cushion pad. The tilt arm for a seat comprises: a coupling arm portion pivotably coupled to a side frame of the cushion frame; and a leading-end-side arm portion coupled and fixed to a leading end portion of the coupling arm portion. A sectional shape of a fixed portion, where the coupling arm portion and the leading-end-side arm portion are coupled and fixed to each other, is a closed sectional shape formed by a closed curve. A sectional shape of the coupling arm portion at the fixed portion and a sectional shape of the leading-end-side arm portion at the fixed portion are each an open sectional shape that is partially opened.

In the tilt arm according to the present disclosure, the coupling arm portion and the leading-end-side arm portion are coupled and fixed to each other. Thus, the tilt arm can be formed relatively easily regardless of the complexity of its shape because the coupling arm portion and the leading-end-side arm portion can be formed separately from each other.

In the present disclosure, the fixed portion, where the coupling arm portion and the leading-end-side arm portion are coupled and fixed to each other, has a closed sectional shape. Thus, flexural rigidity and torsional rigidity of the tilt arm can be improved. Accordingly, in the present disclosure, a tilt arm having a complex shape can be formed relatively easily while achieving improvement in the rigidity of the tilt arm.

The tilt arm according to the present disclosure may be configured as below.

Specifically, a first plate member constituting the coupling arm portion and a second plate member constituting the leading-end-side arm portion may be coupled and fixed to each other at the fixed portion so as to overlap with each other in a plate thickness direction at at least two portions. Further, the at least two portions comprise a first portion and a second portion, and an overlapping direction at the first portion may be a direction intersecting with an overlapping direction at the second portion.

This makes it possible to reliably improve the rigidity of the fixed portion as compared to a case in which the overlapping directions at such two portions are parallel to each other. Further, the overlapping direction at the first portion may be substantially parallel to a seat width direction, and the overlapping direction at the second portion may be substantially parallel to a vertical direction.

Moreover, a lower end position at a leading end portion of the leading-end-side arm portion may be positioned vertically lower than a lower end position at the fixed portion. In this case, characteristics of the present disclosure can be applied effectively.

A vehicle seat according to the present disclosure may comprise: a cushion pad; a displacement mechanism comprising a tilt arm for a seat; and a support member to support a seat front end portion of the side pad portion. The cushion pad may comprise: a seating face pad portion to support the buttocks of an occupant; and a side pad portion provided to a portion adjacent to the seating face pad portion in the seat width direction. The displacement mechanism may cause a seat front end portion of the seating face pad portion to be displaced. The support member may comprises a planar support portion that is in surface contact with the side pad portion to support the side pad portion.

For example, a vehicle seat disclosed in Japanese Unexamined Patent Application Publication No. 2009-179192 comprises a displacement mechanism to cause a front end portion of a seating face pad portion to be displaced. The seating face pad portion is a part of a cushion pad and is a portion to support the buttocks of an occupant.

In general, a side pad portion is provided to a portion adjacent to the seating face pad portion in the seat width direction. The side pad portion is a stationary pad portion, which is not displaced even when a displacement mechanism is actuated, unlike the seating face pad portion.

Since the vehicle seat according to the present disclosure comprises the planar support portion that is in surface contact with the side pad portion to support the side pad portion, it is possible, for example, to reliably support the side pad portion as compared to a linear supporting structure in which the side pad portion is supported by a wire-shaped member.

Specifically, in the linear supporting structure in which the side pad portion is supported by the wire-shaped member, the wire-shaped member and the side pad portion are in linear contact with each other. Thus, when the moment centering on the wire-shaped member acts on the side pad portion, there is a risk that the side pad portion may be rotationally displaced in a rolling manner.

In contrast, in the vehicle seat according to the present disclosure, such rotational displacement of the side pad portion in a rolling manner can be inhibited even when the moment acts on the side pad portion because the planar support portion is in contact with the side pad portion over a larger area than in the linear supporting structure. Accordingly, the side pad portion can be reliably supported.

The vehicle seat according to the present disclosure may be configured as below.

Specifically, the planar support portion may comprise a first receiving surface configured to be in surface contact with the side pad portion so as to be able to receive the load applied in the vertical direction. This makes it possible to reliably receive the load applied in the vertical direction.

The planar support portion may comprise a second receiving surface configured to be in surface contact with the side pad portion so as to be able to receive the load applied in the seat front-rear direction. This makes it possible to reliably support the side pad portion.

The planar support portion may comprise a third receiving surface configured to be in surface contact with the side pad portion so as to be able to receive the load applied in the seat width direction. This makes it possible to support the side pad portion more reliably.

The planar support portion may comprise an outer support portion and an inner support portion. The outer support portion may comprise an outer receiving surface. The inner support portion may comprise an inner receiving surface. In a case where the side pad portion is provided on a seat width direction outer side and on a seat width direction inner side, the outer receiving surface may come in surface contact with an outer pad from a first end side in the seat width direction. Similarly, the inner receiving surface may come in surface contact with an inner pad from the first end side in the seat width direction.

With such a configuration, the side pad portion can be reliably supported even when, in particular, force directed from a second end side toward the first end side in the seat width direction acts on the cushion pad.

The outer receiving surface is a receiving surface configured to be in surface contact with the outer pad positioned on the seat width direction outer side of the seating face pad portion so as to be able to receive the load applied in the seat width direction. The inner receiving surface is a receiving surface configured to be in surface contact with the inner pad positioned on the seat width direction inner side of the seating face pad portion so as to be able to receive the load applied in the seat width direction.

It is preferred to apply the present disclosure to the vehicle seat in which the support member is provided to a leading end portion of the tilt arm.

The vehicle seat may comprise: a cushion frame to support the cushion pad; a shield that is supported by the cushion frame and that covers at least part of a side of the cushion frame; a first protrusion protruding in a direction intersecting with the seat width direction; and a second protrusion protruding in a direction parallel to the first protrusion. The first protrusion may be provided to either one of the cushion frame or the shield and may be inserted into a first insertion hole arranged to the other of the cushion frame or the shield. The second protrusion may be provided to either one of the cushion frame or the shield and may be inserted into a second insertion hole arranged to the other of the cushion frame or the shield. Further, an inserting-direction length of a portion of the first protrusion inserted into the first insertion hole may be longer than an inserting-direction length of a portion of the second protrusion inserted into the second insertion hole.

In a vehicle seat disclosed in Japanese Unexamined Patent Application Publication No. H11-005473, a shield is fixed to a cushion frame by fastener fittings such as screws. The shield is a kind of cover that covers at least part of a side portion of the cushion frame.

In the invention disclosed in Japanese Unexamined Patent Application Publication No. H11-005473, a screw tightening step is required in the assembly process, and thus, reduction of assembly man-hours is difficult.

With the configuration of the present disclosure, an assembly worker or an automatic assembly device (hereinafter referred to as a worker or the like) can mount the shield to the cushion frame by inserting the first protrusion and the second protrusion respectively into the first insertion hole and the second insertion hole. Further, since the first protrusion and the second protrusion extend in a direction intersecting with the seat width direction, the shield can be inhibited from falling off in the seat width direction.

In a case of a vehicle seat in which, for example, a fixing portion corresponding to the second protrusion is configured with a wire-shaped member and in which a fixed portion corresponding to the second insertion hole is configured with a catching portion that catches the wire-shaped member (hereinafter referred to as a wire method), assemblability is poor, and thus, reduction of man-hours is difficult.

Specifically, in the wire method, the worker or the like needs to cause a shield to be warped such that the shield is rotated about the first protrusion side after the first protrusion is inserted into the first insertion hole to thereby cause the wire to be caught by the catching portion. That is, in the wire method, reduction of man-hours is difficult because different kinds of assembly works, such as an insertion work and a catching work, are required.

In contrast, with the configuration of the present disclosure, the worker or the like can insert and mount the first protrusion and the second protrusion respectively into the first insertion hole and the second insertion hole by moving the shield in a single direction, that is, in the direction intersecting with the seat width direction, with respect to the cushion frame.

Accordingly, with the configuration of the present disclosure, reduction of man-hours is enabled while inhibiting the shield from falling off in the seat width direction.

The first protrusion and the second protrusion may each protrude in the seat front-rear direction. This makes it possible to insert and mount the first protrusion and the second protrusion respectively into the first insertion hole and the second insertion hole by moving the shield in the seat front-rear direction with respect to the cushion frame. Further, the second protrusion may protrude in the same direction as the first protrusion.

The first protrusion may be provided lower than the second protrusion. This makes it possible to fix the shield reliably even when the moment centering on a rotation axis directed in the seat front-rear direction acts on the shield.

In the case where the cushion frame comprises the tilt arm, the first protrusion and the second protrusion may be provided to the tilt arm and may protrude in a direction from a rear side toward a front side in the seat front-rear direction. The shield may comprise: a front-side shield portion that comprises the first insertion hole and the second insertion hole and that moves in a pivoting manner integrally with the tilt arm; and a rear-side shield portion fixed to the cushion frame.

With the configuration of the present disclosure, design property (good appearance) of the shield can be inhibited from being damaged because the front-side shield portion can be displaced correspondingly to the pivoting movement of the tilt arm.

BRIEF DESCRIPTION OF THE DRAWINGS

An embodiment of the present disclosure will be described below with reference to the accompanying drawings, in which:

FIG. 12 is a diagram showing the supporting structure for the side pad portion according to one embodiment;

DETAILED DESCRIPTION OF THE PREFERRED EMBODIMENTS

Figure 1:
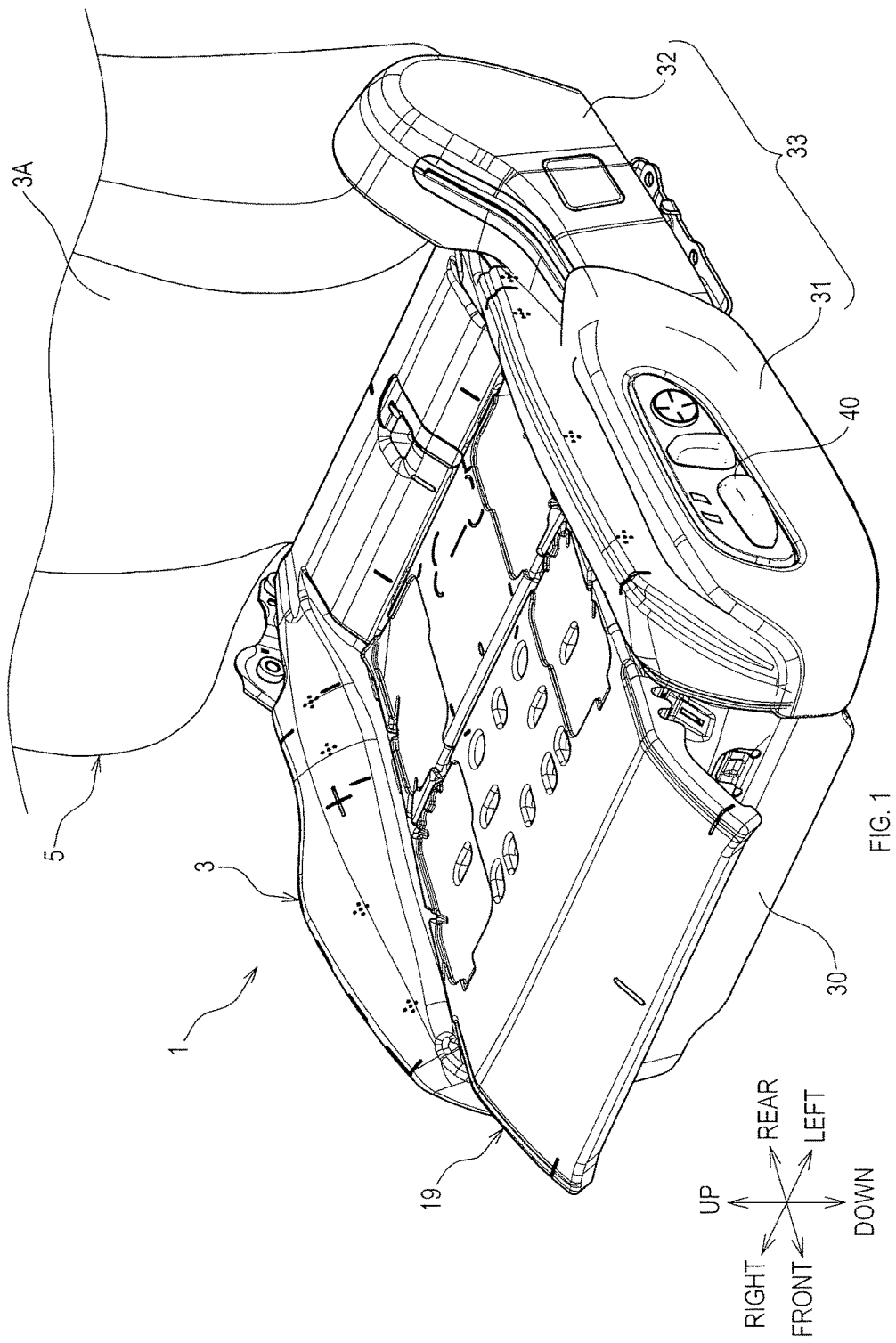
FIG. 1 is a perspective view of a vehicle seat according to one embodiment.

An "embodiment" to be described below shows one example of embodiments belonging to the technical scope of the present disclosure. That is, the invention-specifying matters and so on recited in the claims are not limited to specific configurations, structures, and so on illustrated in the below-described embodiment.

Arrows and the like indicating directions in the drawings are intended to facilitate understanding of mutual relationships between the drawings. The arrows and the like (directions) in the drawings do not limit the scope of the present disclosure.

A member or a portion described at least with a reference numeral assigned thereto is at least one in number except in the presence of indication such as "one". That is, such a member or portion may be two or more in number.

In the present embodiment, an explanation will be given of a front seat of an ordinary passenger vehicle. Directions in the explanation below refer to directions in a state in which a vehicle seat according to the present embodiment is mounted to the vehicle.

1. Outline of Vehicle Seat

As shown in FIG. 1, a vehicle seat 1 comprises at least a seat cushion 3 and a seatback 5. The seat cushion 3 is a portion to support the buttocks and so on of an occupant. The seatback 5 is a portion to support the back of the occupant, and is pivotable with respect to the seat cushion 3 in the seat front-rear direction.

1.1 Frame Structure

Figure 2:
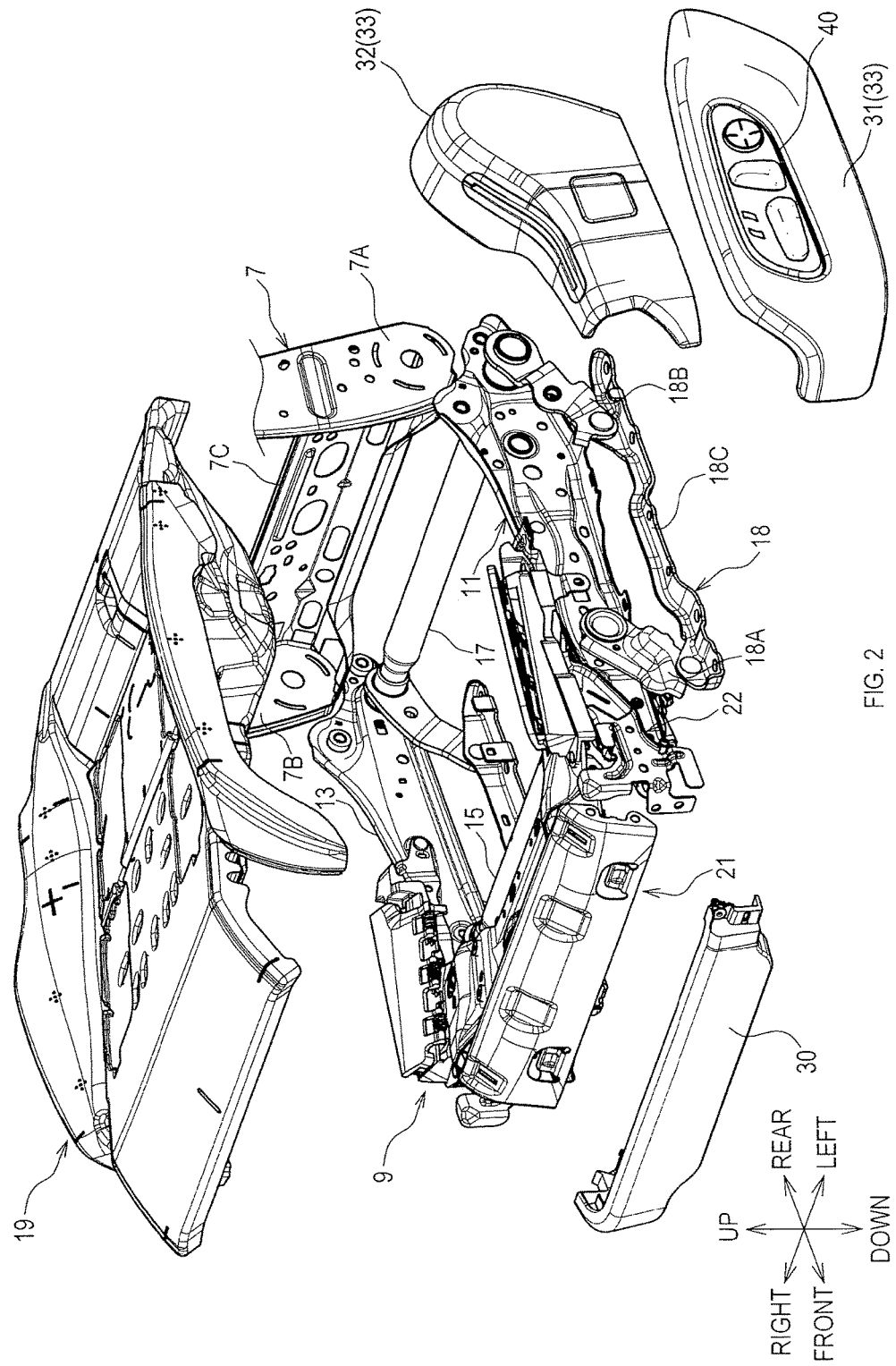
FIG. 2 is an exploded perspective view of a seat cushion according to one embodiment.

A back frame 7 shown in FIG. 2 is a frame that forms the framework of the seatback 5, and is pivotably coupled to a cushion frame 9. The cushion frame 9 is a frame that forms the framework of the seat cushion 3.

The back frame 7 comprises two side frames 7A and 7B, an upper panel (not shown), and a lower panel 7C. The side frames 7A and 7B are each a frame that extends in a substantially vertical direction and that is arranged on either side in the seat width direction. The seat width direction corresponds to the left-right direction of the vehicle in the present embodiment.

The upper panel extends in the seat width direction and couples upper ends of the side frames 7A and 7B to each other. The lower panel 7C extends in the seat width direction and couples lower ends of the side frames 7A and 7B to each other.

The two side frames 7A and 7B, the upper panel, and the lower panel 7C are made of metal. The two side frames 7A and 7B are each coupled and fixed to the upper panel and the lower panel 7C by joining means such as welding or by mechanical fasteners such as screws.

The cushion frame 9 comprises two side frames 11 and 13, a front pipe 15, and a rear pipe 17. The side frames 11 and 13 are each a frame that extends in the seat front-rear direction and that is arranged on either side in the seat width direction.

The front pipe 15 couples the two side frames 11 and 13 to each other on a seat front side of the cushion frame 9. The rear pipe 17 couples the two side frames 11 and 13 to each other on a seat rear side of the cushion frame 9.

The front pipe 15 and the rear pipe 17 are each coupled to the two side frames 11 and 13 by a coupling method such as welding or caulking with utilization of plastic working. In the present embodiment, the front pipe 15 and the rear pipe 17 are each fixed to the respective side frames 11 and 13 by welding.

The cushion frame 9 is supported by two seat lifters 18. The two seat lifters 18 are arranged below the respective side frames 11 and 13, and displace the cushion frame 9 in the vertical direction.

Specifically, the respective seat lifters 18 each comprise a front lifter link 18A, a rear lifter link 18B, and a bracket 18C. The front lifter link 18A and the rear lifter link 18B are pivotably coupled at upper ends thereof to each of the side frames 11 and 13, and coupled at lower ends thereof to the bracket 18C.

The bracket 18C is fixed to a floor panel of the vehicle via a slide rail (not shown). The slide rail allows for fixation of the vehicle seat 1 to the floor panel so as to enable the vehicle seat 1 to be displaced in the seat front-rear direction.

1.2 Cushion Structure

Mounted to the back frame 7 on a seat front side thereof is a back pad 3A (see FIG. 1). The back pad 3A is a cushion member configured with foamed elastic body such as urethane foam. A surface of the back pad 3A is covered with a cover made of leather or the like.

Figure 3:
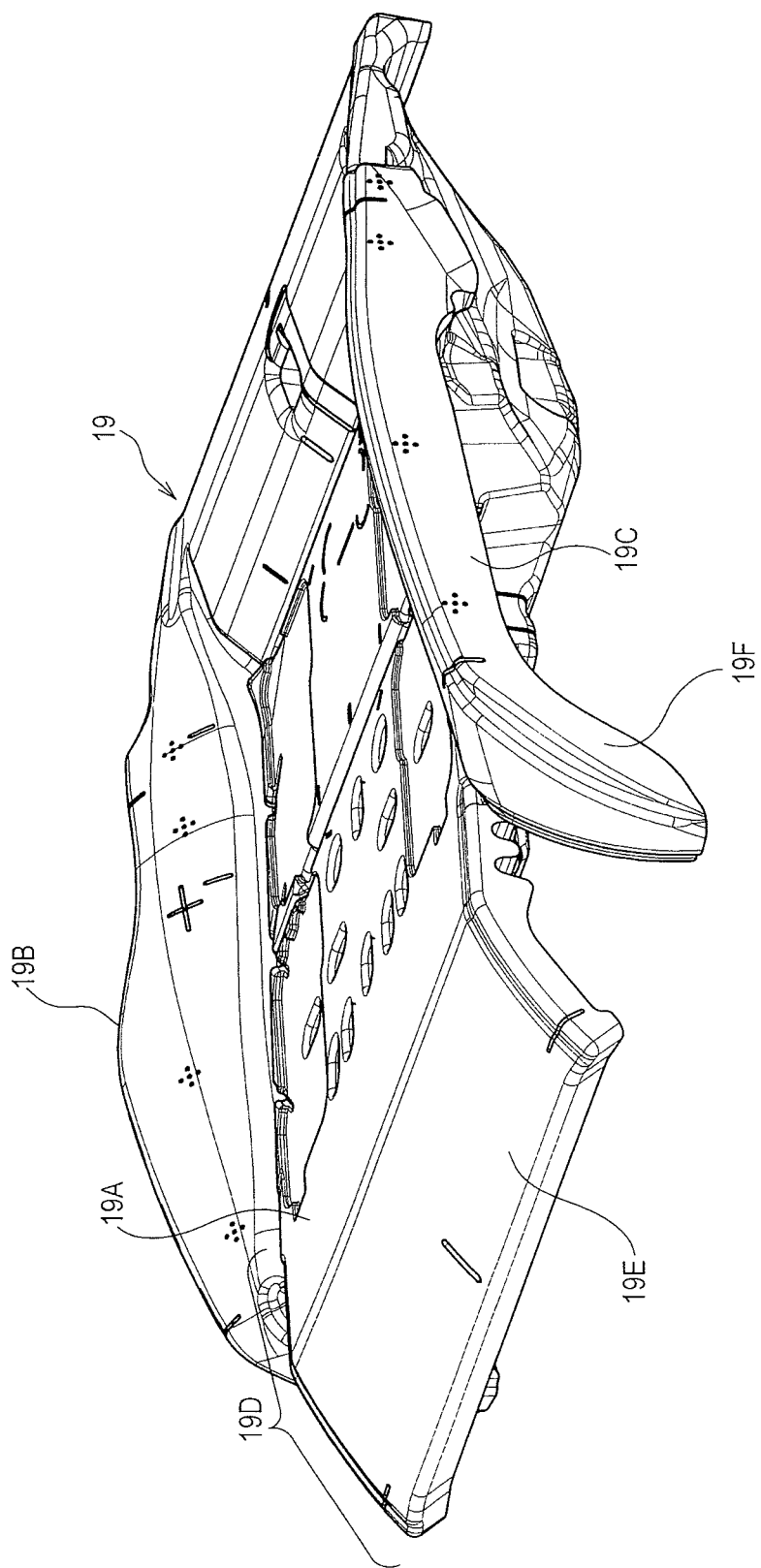
FIG. 3 is a perspective view of a cushion pad according to one embodiment.

Mounted to the cushion frame 9 on an upper side thereof is a cushion pad 19 (see FIG. 2). As shown in FIG. 3, the cushion pad 19 comprises a seating face pad portion 19A and side pad portions 19B and 19C.

The seating face pad portion 19A is a cushion member to support the buttocks of the occupant. The side pad portions 19B and 19C are cushion members each provided to a portion adjacent to the seating face pad portion 19A in the seat width direction.

The respective side pad portions 19B and 19C extend in the seat front-rear direction at the respective end portions of the seating face pad portion 19A in the seat width direction. The seating face pad portion 19A and the two side pad portions 19B and 19C are integrally formed of urethane or the like.

The vehicle seat 1 according to the present embodiment is a front seat on the left side of the vehicle. Thus, the side pad portion 19B positioned on a seat width direction inner side of the seating face pad portion 19A, that is, on the central side in the vehicle-width direction, is also referred to as an inner pad 19B.

The side pad portion 19C positioned on a seat width direction outer side of the seating face pad portion 19A is also referred to as an outer pad 19C.

2. Details of Vehicle Seat 2.1 Displacement Mechanism

<Outline of Displacement Mechanism>

Figure 4:
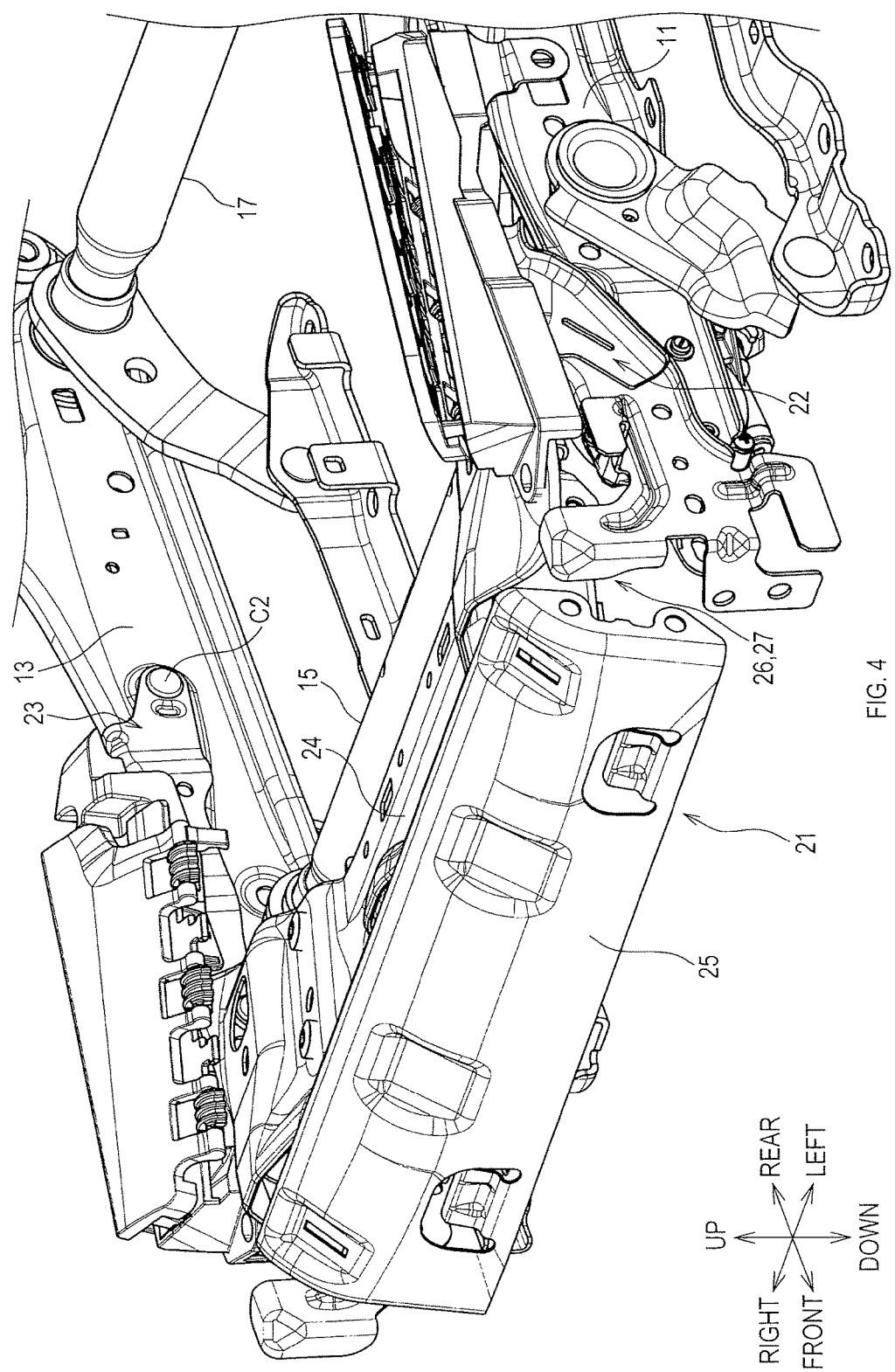
FIG. 4 is an enlarged view of a displacement mechanism and so on according to one embodiment.

The vehicle seat 1 comprises a displacement mechanism 21 (see FIG. 4). The displacement mechanism 21 is a mechanism to displace a seat front end portion 19D (see FIG. 3) of the seating face pad portion 19A. Specifically, the displacement mechanism 21 has at least one of a tilt function, an ottoman function, and a cushion length changeable function. The displacement mechanism 21 according to the present embodiment has the tilt function and the ottoman function.

The tilt function is a function to displace the seat front end portion 19D in the vertical direction while changing an angle of inclination of a front end portion of the cushion pad 19, that is, an angle of inclination of the seat front end portion 19D. The ottoman function is a function to change an angle of inclination of an ottoman 19E (see FIG. 3). The ottoman 19E is a portion on which part of legs such as calves is laid. The cushion length changeable function is a function to change a seat front-rear length of the seating face pad portion 19A by displacement of a front edge portion of the seat cushion 3.

In the displacement mechanism 21 according to the present embodiment, as the angle of inclination (hereinafter referred to as a tilt angle) of the seat front end portion 19D becomes larger, the face of the ottoman 19E is correspondingly moved in a pivoting manner so as to come closer to a horizontal position. In contrast, as the tilt angle becomes smaller, the face of the ottoman 19E correspondingly becomes closer to a vertical position.

<Structure of Displacement Mechanism>

Figure 5:
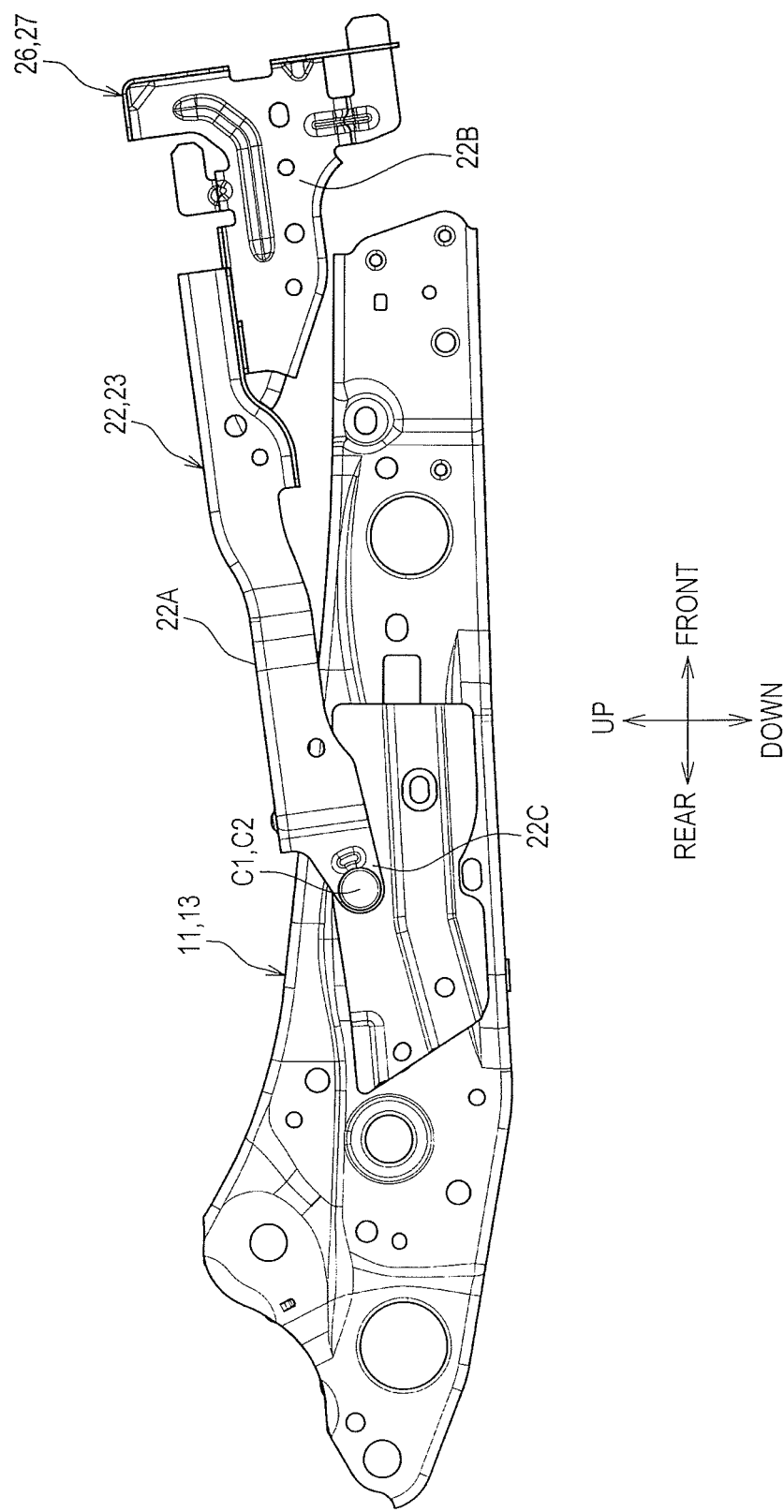
FIG. 5 is a side view of a tilt arm, a side frame, and so on according to one embodiment.

As shown in FIG. 4, the displacement mechanism 21 comprises two tilt arms 22 and 23, and a tilt panel 24. As shown in FIG. 5, the two tilt arms 22 and 23 are pivotably coupled to the side frames 11 and 13, respectively, via coupling pins C1 and C2, respectively. As shown in FIG. 5, the tilt arms 22 and 23 respectively extend from where the coupling pins C1 and C2 are present toward a seat front side.

As shown in FIG. 4, the tilt panel 24 is a plate-shaped member extending in the seat width direction so as to couple extending-direction leading ends of the respective tilt arms 22 and 23 to each other. A front end portion of the seating face pad portion 19A is supported by the tilt panel 24. Thus, as the tilt arms 22 and 23 are moved in a pivoting manner, the tilt angle of the front end portion of the seating face pad portion 19A correspondingly changes.

A front panel 25 is a portion to support the ottoman 19E. Pivoting movement of the two tilt arms 22 and 23 is transmitted to the front panel 25 via a not-shown link mechanism or cam mechanism. Thus, the ottoman 19E is moved in a pivoting manner with respect to the tilt panel 24 correspondingly to the pivoting movement of the two tilt arms 22 and 23.

<Structure of Tilt Arm>

The tilt arm 22 and the tilt arm 23 have similar structures except that they are symmetrical to each other. An explanation will be given below of the structure of the tilt arms 22 and 23 according to the present embodiment taking the tilt arm 22 as an example.

Figure 7:
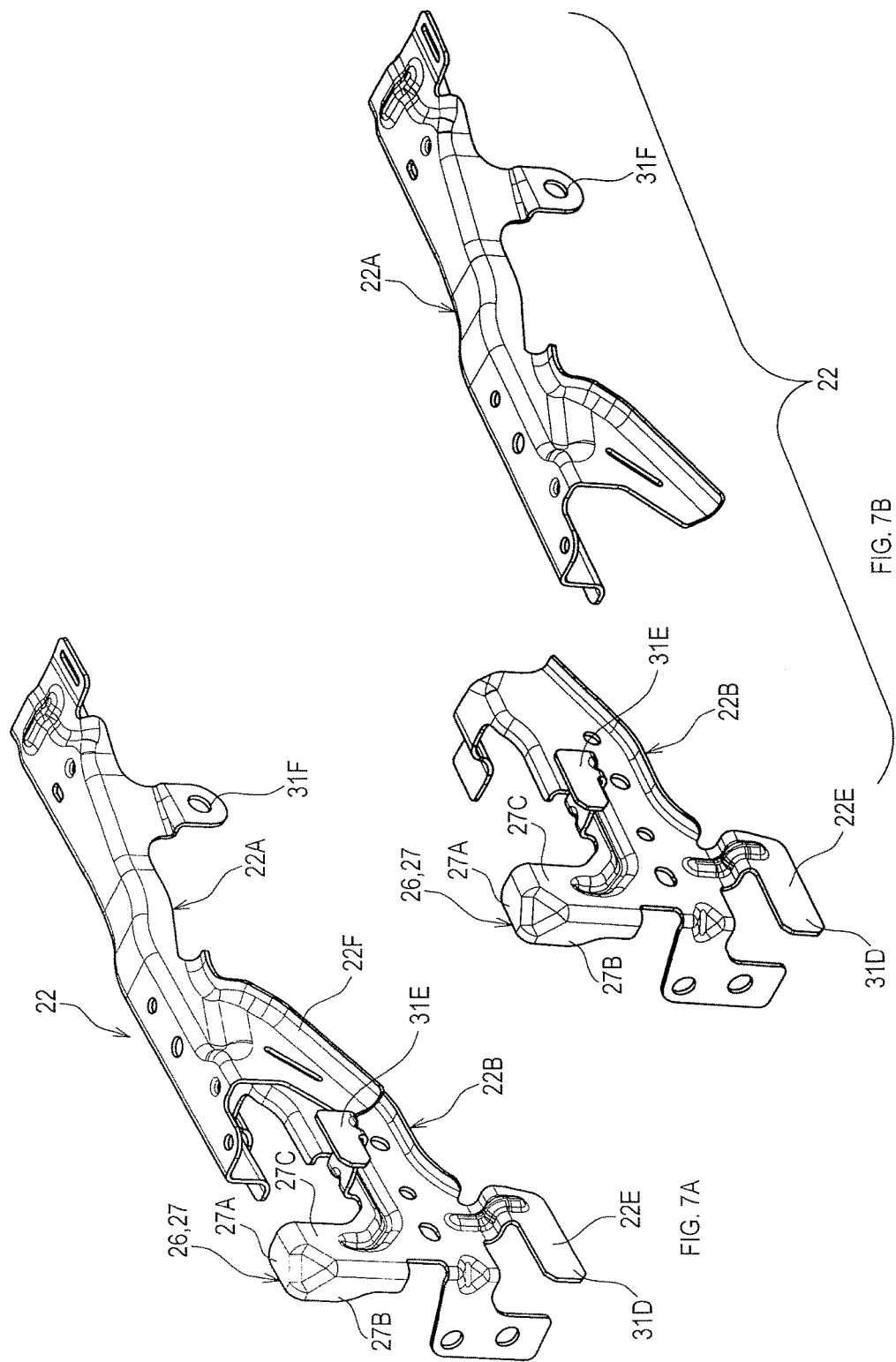
FIG. 7A is a perspective view of the tilt arm according to one embodiment.
FIG. 7B is an exploded perspective view of the tilt arm according to one embodiment.

As shown in FIGS. 7A and 7B, the tilt arm 22 comprises a coupling arm portion 22A and a leading-end-side arm portion 22B. The coupling arm portion 22A comprises a coupling portion 22C (see FIG. 5), which is pivotably coupled to the side frame 11 via the coupling pin C1.

Figure 8:
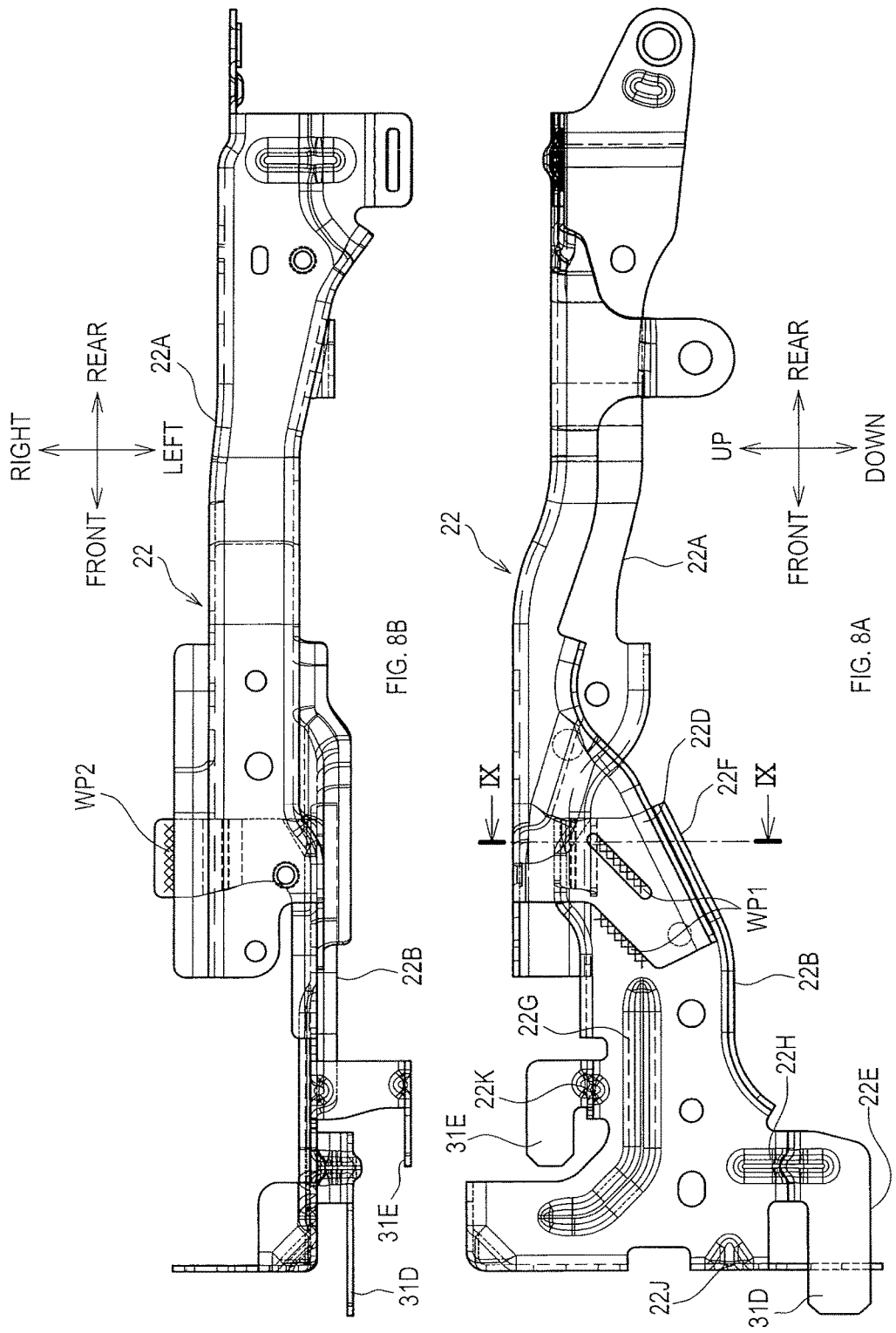
FIG. 8A is a side view of the tilt arm according to one embodiment.
FIG. 8B is a top view of the tilt arm according to one embodiment.

The leading-end-side arm portion 22B is coupled and fixed to a leading end portion of the coupling arm portion 22A. In the present embodiment, the leading-end-side arm portion 22B and the coupling arm portion 22A are coupled and fixed to each other by welding as shown in FIGS. 8A and 8B.

Figure 9:
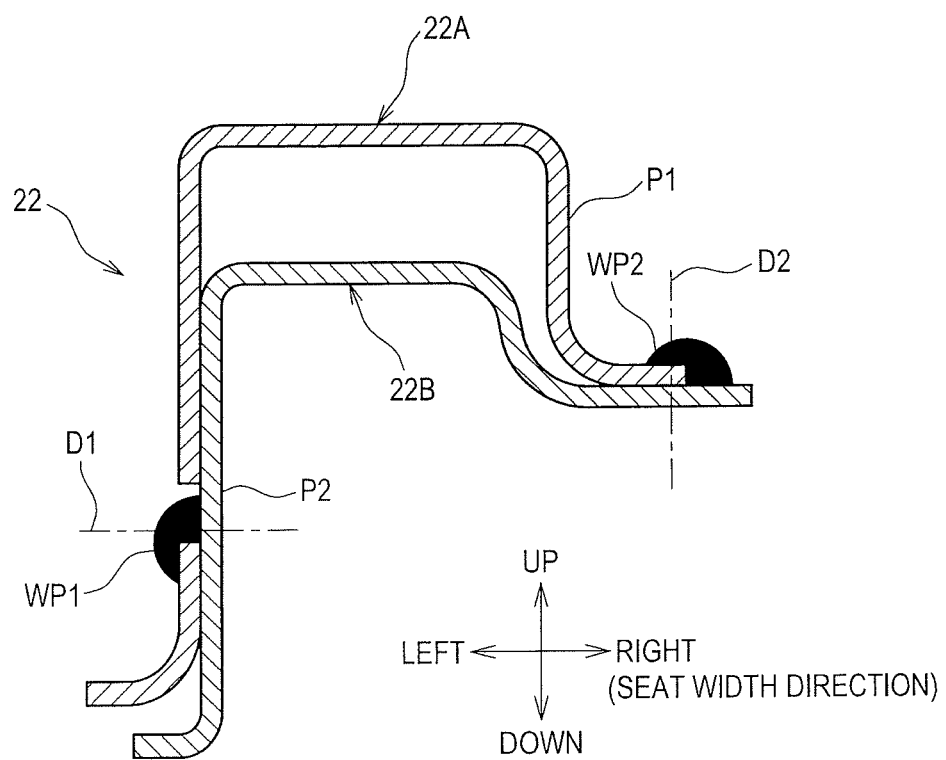
FIG. 9 is a sectional view taken along IX-IX line in FIG. 8A.

A sectional shape, perpendicular to the seat front-rear direction, of a fixed portion 22D, where the coupling arm portion 22A and the leading-end-side arm portion 22B are coupled and fixed to each other, is a closed sectional shape formed by a closed curve as shown in FIG. 9. Specifically, the coupling arm portion 22A and the leading-end-side arm portion 22B form a closed space. A sectional shape, perpendicular to the seat front-rear direction, of the coupling arm portion 22A at the fixed portion 22D is an open sectional shape having a substantially C-like or J-like shape that is partially opened. Specifically, the coupling arm portion 22A, as a single body, has a sectional shape that opens partially.

Similarly, a sectional shape, perpendicular to the seat front-rear direction, of the leading-end-side arm portion 22B at the fixed portion 22D is an open sectional shape having a substantially C-like or J-like shape that is partially opened. In the present embodiment, the cross-section of the coupling arm portion 22A perpendicular to the seat front-rear direction and the cross-section of the leading-end-side arm portion 22B perpendicular to the seat front-rear direction each have an open sectional shape that opens on the side of the side frame 11.

At the fixed portion 22D, a first plate member P1 constituting the coupling arm portion 22A and a second plate member P2 constituting the leading-end-side arm portion 22B are coupled and fixed to each other so as to overlap with each other in a plate thickness direction at at least two portions.

The at least two portions comprise a first portion WP1 and a second portion WP2. An overlapping direction D1 at the first portion WP1 is a direction intersecting with an overlapping direction D2 at the second portion WP2. Specifically, the overlapping direction D1 at the first portion WP1 is substantially parallel to the seat width direction, and the overlapping direction D2 at the second portion WP2 is substantially parallel to the vertical direction.

As shown in FIG. 8A, a welded portion at the first portion WP1 extends in a direction inclined with respect to the longitudinal direction of the coupling arm portion 22A (the seat front-rear direction) and with respect to the vertical direction. As shown in FIG. 8B, a welded portion at the second portion WP2 extends in a direction parallel to the longitudinal direction of the coupling arm portion 22A.

As shown in FIG. 8A, a lower end position 22E at a leading end portion of the leading-end-side arm portion 22B is positioned vertically lower than a lower end position 22F at the fixed portion 22D. In other words, in the tilt arm 22 according to the present embodiment, the vertical dimension thereof becomes larger toward the extending-direction leading end thereof, that is, toward a seat front end thereof.

Bead portions 22G to 22K are ridge portions or groove portions for improving flexural rigidity and torsional rigidity of the leading-end-side arm portion 22B, that is, flexural rigidity and torsional rigidity of the tilt arms 22 and 23. The bead portion 22G extends along an outside edge of each of the tilt arms 22 and 23. The bead portions 22H to 22K are provided at bent portions at which the plate member constituting the leading-end-side arm portion 22B is bent.

2.2 Supporting Structure for Side Pad Portion

Seat-front-side portions of the side pad portions 19B and 19C are respectively supported by the tilt arms 23 and 22. A supporting structure for the side pad portion will be described below taking the tilt arm 23 (on the seat right side) as an example.

Figure 10:
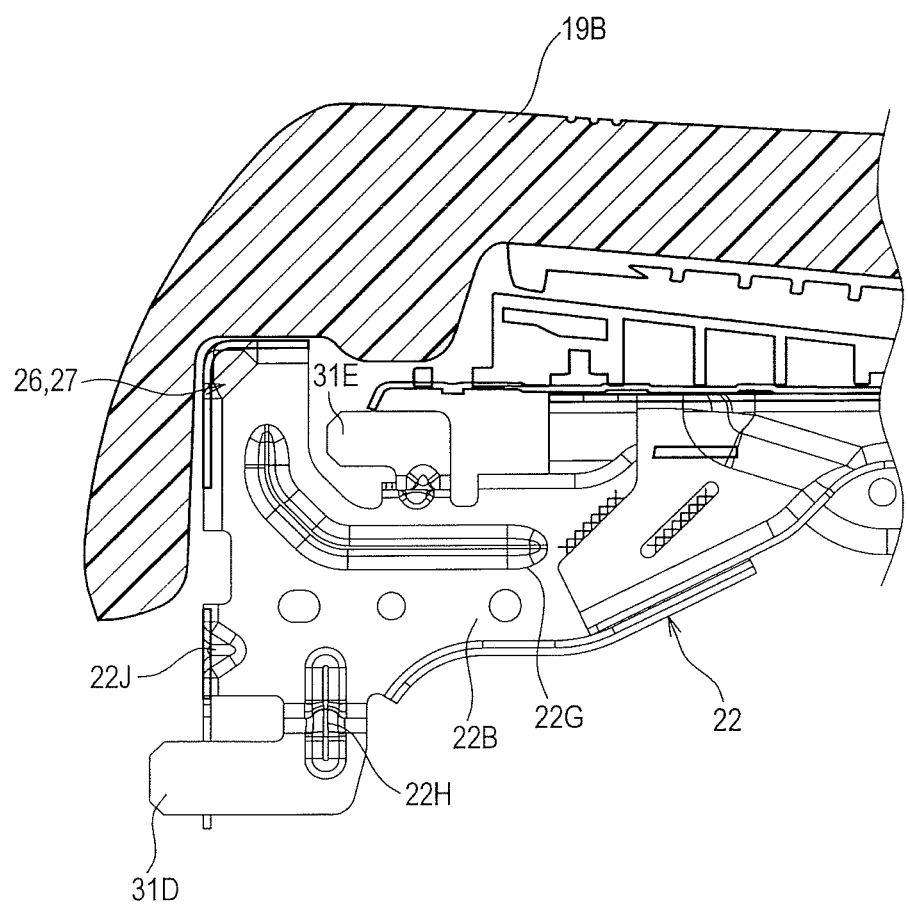
FIG. 10 is a diagram showing a supporting structure for a side pad portion according to one embodiment.

As shown in FIG. 10, a seat front end portion of the side pad portion 19B is supported by a support member 26 comprising a planar support portion 27. The planar support portion 27 is a portion to support the side pad portion 19B by being in surface contact with the side pad portion 19B.

Figure 11:
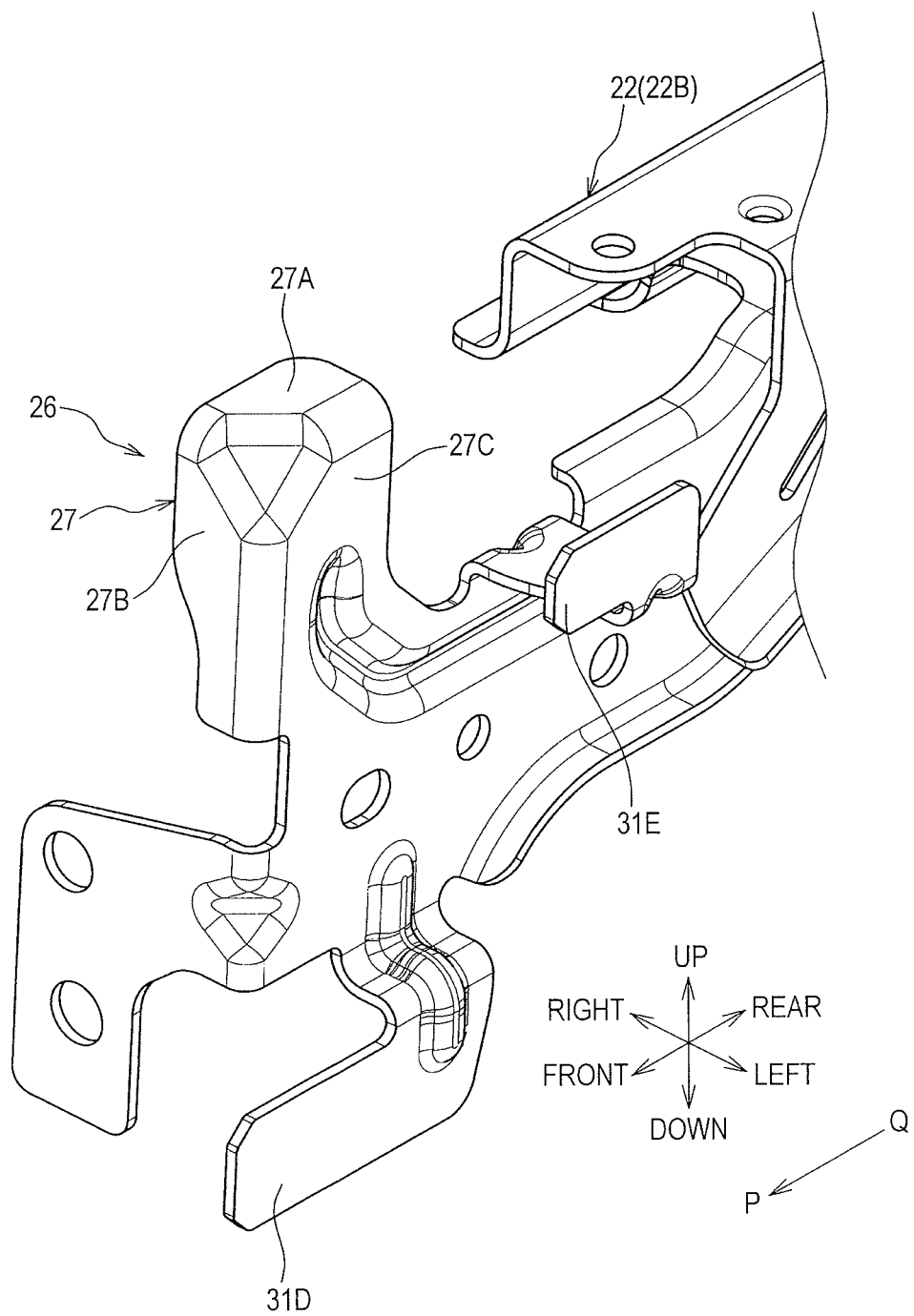
FIG. 11 is an enlarged perspective view of a leading end portion of the tilt arm according to one embodiment.

Specifically, as shown in FIG. 11, the planar support portion 27 comprises receiving surfaces 27A to 27C to come in surface contact with at least the side pad portion 19B. The receiving surface 27A (hereinafter referred to as a first receiving surface 27A) is a surface to come in surface contact with the side pad portion 19B so as to be able to receive the load applied in the vertical direction.

The receiving surface 27B (hereinafter referred to as a second receiving surface 27B) is a surface to come in surface contact with the side pad portion 19B so as to be able to receive the load applied in the seat front-rear direction. The second receiving surface 27B according to the present embodiment receives the load applied in a direction from the seat front side toward the seat rear side.

The receiving surface 27C (hereinafter referred to as the third receiving surface 27C) is a surface to come in surface contact with the side pad portion 19B so as to be able to receive the load applied in the seat width direction. In the present embodiment, as shown in FIG. 12, the third receiving surface 27C at a first end side in the seat width direction and the third receiving surface 27C at a second end side in the seat width direction are not symmetrical to each other.

Specifically, assuming that the third receiving surface 27C of the planar support portion 27 (hereinafter referred to as an inner support portion 26A) to come in surface contact with the inner pad 19B is referred to as an inner receiving surface 27R and that the third receiving surface 27C of the planar support portion 27 (hereinafter referred to as an outer support portion 26B) to come in surface contact with the outer pad 19C is referred to as an outer receiving surface 27L, the respective receiving surfaces 27R and 27L are configured as below.

The outer receiving surface 27L comes in surface contact with the outer pad 19C from the first end side in the seat width direction, and the inner receiving surface 27R comes in surface contact with the inner pad 19B from the first end side in the seat width direction. In other words, in the present embodiment, the outer receiving surface 27L comes in surface contact with the outer pad 19C from the right side (inner side), and the inner receiving surface 27R also comes in surface contact with the inner pad 19B from the right side (inner side).

2.3 Supporting Structure for Shield

<Outline of Shield>

As shown in FIGS. 1 and 2, sides of the cushion frame 9 are covered with shields 30 and 33, and so on. The shield 30 (hereinafter referred to as a front shield 30) covers a seat front face of the cushion frame 9.

The front shield 30 extends in the seat width direction and is mounted to leading end portions of the two tilt arms 22 and 23. The front shield 30 according to the present embodiment is fixed to the tilt arms 22 and 23 by fasteners (not shown) such as screws.

The shield 33 (hereinafter referred to as a side shield 33) covers the second end (in the present embodiment, the left end), in the seat width direction, of the cushion frame 9. Also provided to the first end (in the present embodiment, the right end) in the seat width direction is a side shield (not shown) similar to the side shield 33. A configuration of the side shield and a supporting structure for the side shield will be described below taking the side shield 33 on the left side as an example.

The side shield 33 on the left side is provided with an operation portion 40 for changing an angle of inclination of the seatback 5 and a position of the seat cushion 3. The operation portion 40 is not provided to the side shield 33 on the right side.

The side shield 33 is configured with a front-side shield portion 31, a rear-side shield portion 32, and so on. The front-side shield portion 31 is mounted to the tilt arm 22, which is part of the cushion frame 9, and moves in a pivoting manner integrally with the tilt arm 22.

The rear-side shield portion 32 is fixed to the cushion frame 9, specifically to the side frame 11, and is stationary. The rear-side shield portion 32 according to the present embodiment is fixed to the side frame 11 by mechanical fasteners such as screws, or by a mechanical joining method such as snap-fitting. The snap-fitting is an engaging and fixing method utilizing elastic deformation of the rear-side shield portion 32 or the side frame 11.

<Supporting Structure for Front-Side Shield Portion>

Figure 13:
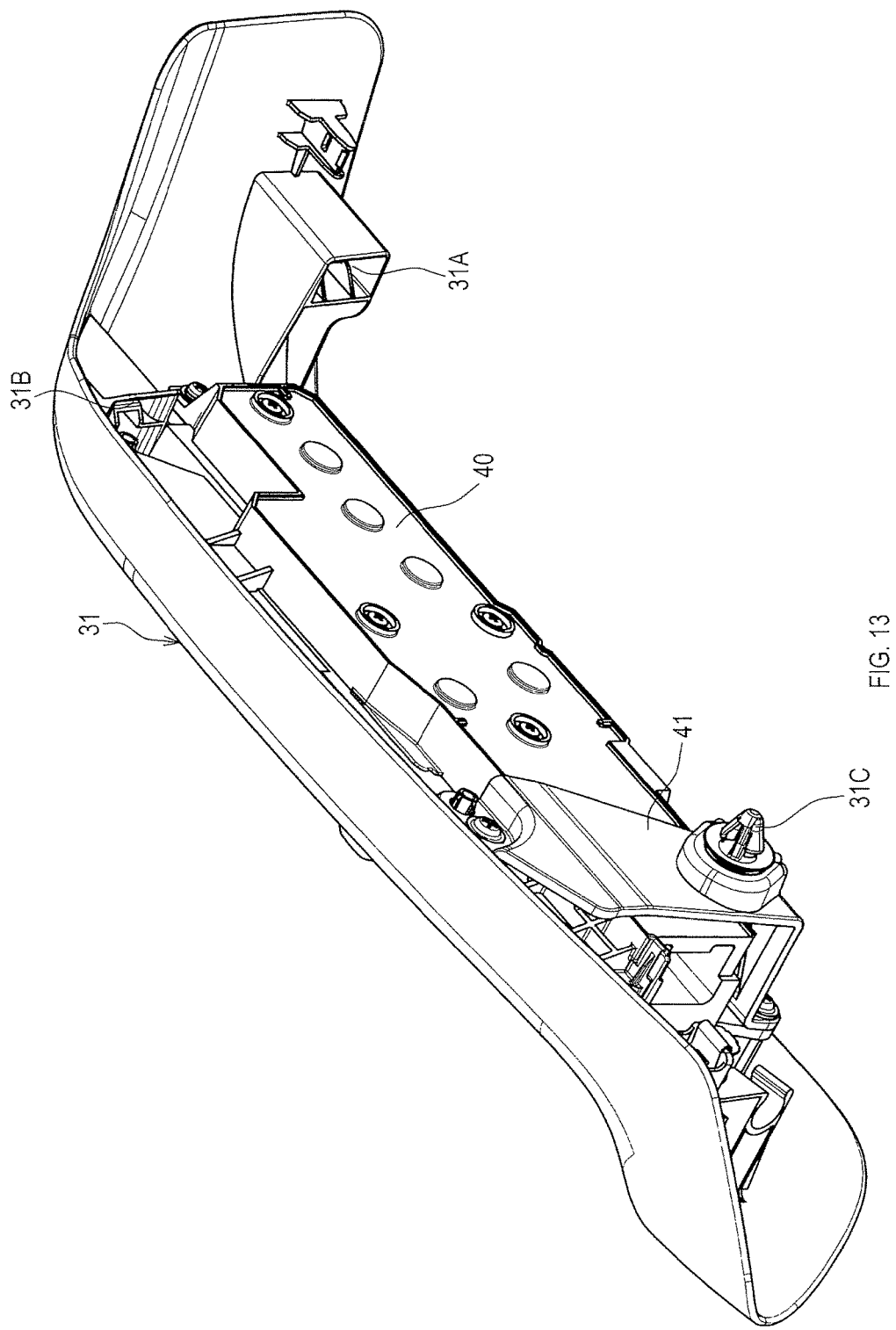
FIG. 13 is a perspective view of a back-side portion of a front-side shield portion according to one embodiment.

As shown in FIG. 13, the operation portion 40 is mounted to the back side of the front-side shield portion 31 by means of a fixing bracket 41 and so on. The back side of the front-side shield portion 31 refers to a side facing the side frame 11 and the tilt arm 22.

The fixing bracket 41 is fixed to the front-side shield portion 31 by fasteners such as screws. The front-side shield portion 31 in the explanation below has the operation portion 40, the fixing bracket 41, and so on mounted thereto as shown in FIG. 13.

Figure 14:
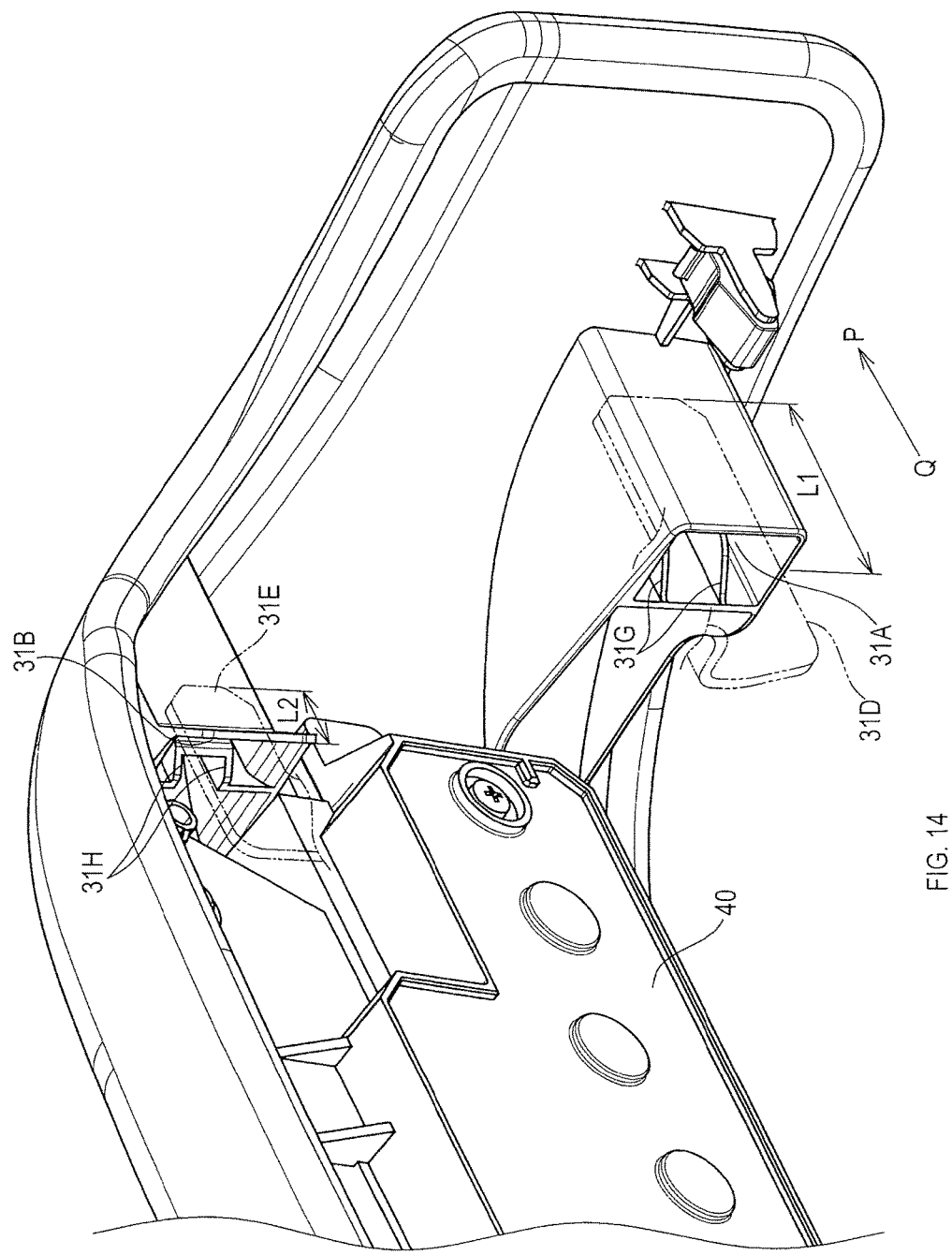
FIG. 14 is an enlarged perspective view of a front end portion of the front-side shield portion according to one embodiment.

Provided to the front-side shield portion 31, as mounting portions for mounting the front-side shield portion 31 to the tilt arm 22, are a first insertion hole 31A and a second insertion hole 31B shown in detail in FIG. 14, and a third protrusion 31C shown in FIG. 13.

Figure 15:
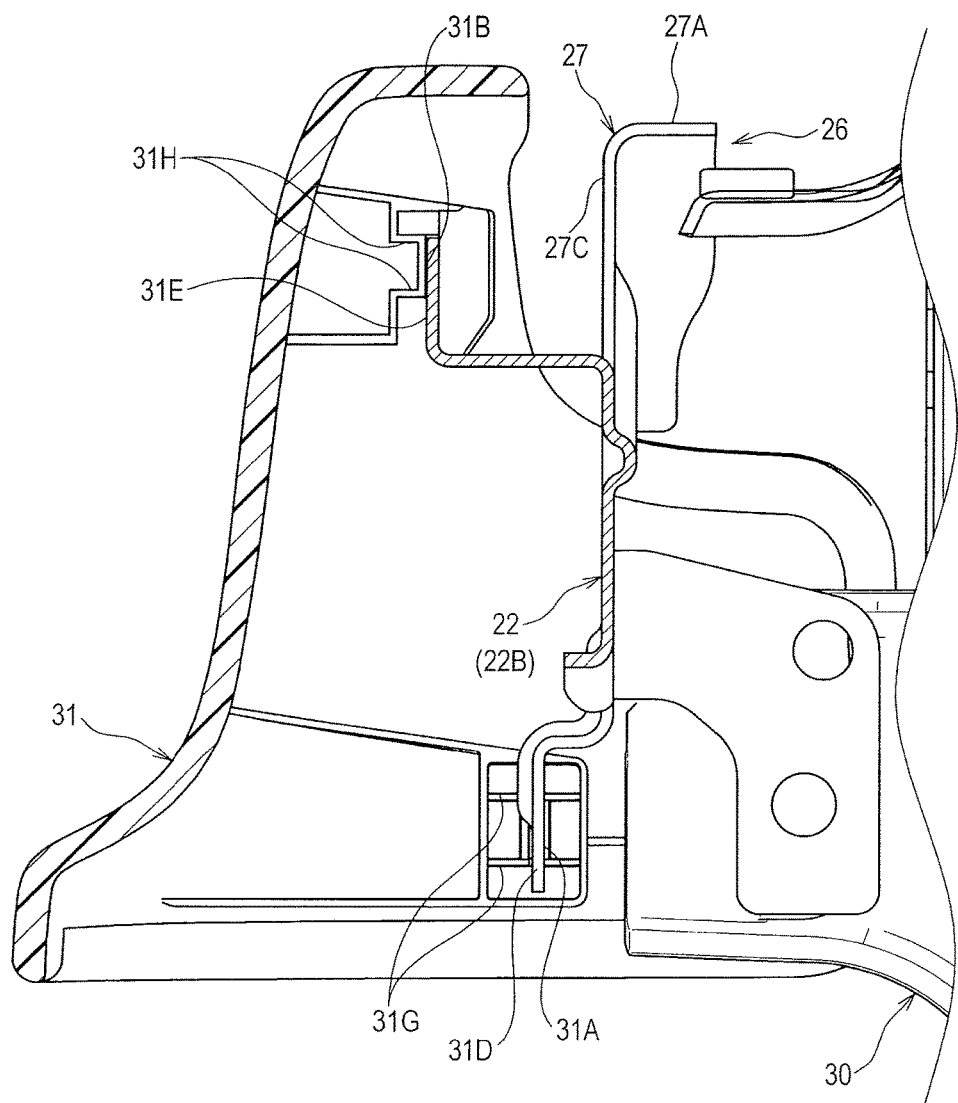
FIG. 15 is a diagram showing a supporting structure for the front-side shield portion according to one embodiment.

As shown in FIG. 15, the tilt arm 22 comprises a first protrusion 31D inserted into the first insertion hole 31A, and a second protrusion 31E inserted into the second insertion hole 31B. As shown in FIG. 11, the first protrusion 31D protrudes in a direction intersecting with the seat width direction.

The second protrusion 31E protrudes in a direction parallel to the first protrusion 31D. The first protrusion 31D and the second protrusion 31E according to the present embodiment protrude in the same direction in the seat front-rear direction.

Specifically, the first protrusion 31D and the second protrusion 31E both protrude in a direction from the seat rear side toward the seat front side, and are each configured with a protruding piece having a plate surface substantially perpendicular to the seat width direction. Further, the first protrusion 31D is positioned lower and on the seat front side with respect to the second protrusion 31E.

In a state where the first protrusion 31D and the second protrusion 31E are respectively inserted into the first insertion hole 31A and the second insertion hole 31B (hereinafter referred to as a shield mounted state), an inserting-direction length L1 is longer than an inserting-direction length L2 as shown in FIG. 14.

The inserting-direction length L1 is an inserting-direction length of a portion of the first protrusion 31D inserted into the first insertion hole 31A. The inserting-direction length L2 is an inserting-direction length of a portion of the second protrusion 31E inserted into the second insertion hole 31B.

In the present embodiment, to achieve the above-described shield mounted state, a leading-end position of the first protrusion 31D is positioned more on a forward side P in the inserting direction than a leading-end position of the second protrusion 31E. Also, the inserting-direction length L1 of the first protrusion 31D is larger than the inserting-direction length L2 of the second protrusion 31E.

As shown in FIGS. 14 and 15, the first insertion hole 31A and the second insertion hole 31B comprise, on their insertion opening side (on an insertion-direction backward side Q), guide portions 31G and 31H, respectively. The guide portions 31G and 31H are inclined with respect to the insertion direction, and respectively guide a leading end of the first protrusion 31D and a leading end of the second protrusion 31E into the first insertion hole 31A and the second insertion hole 31B, respectively.

In the state where the first protrusion 31D is inserted into the first insertion hole 31A, and in the state where the second protrusion 31E is inserted into the second insertion hole 31B, contact surface pressure set in advance is generated at respective contact portions.

Figure 6:
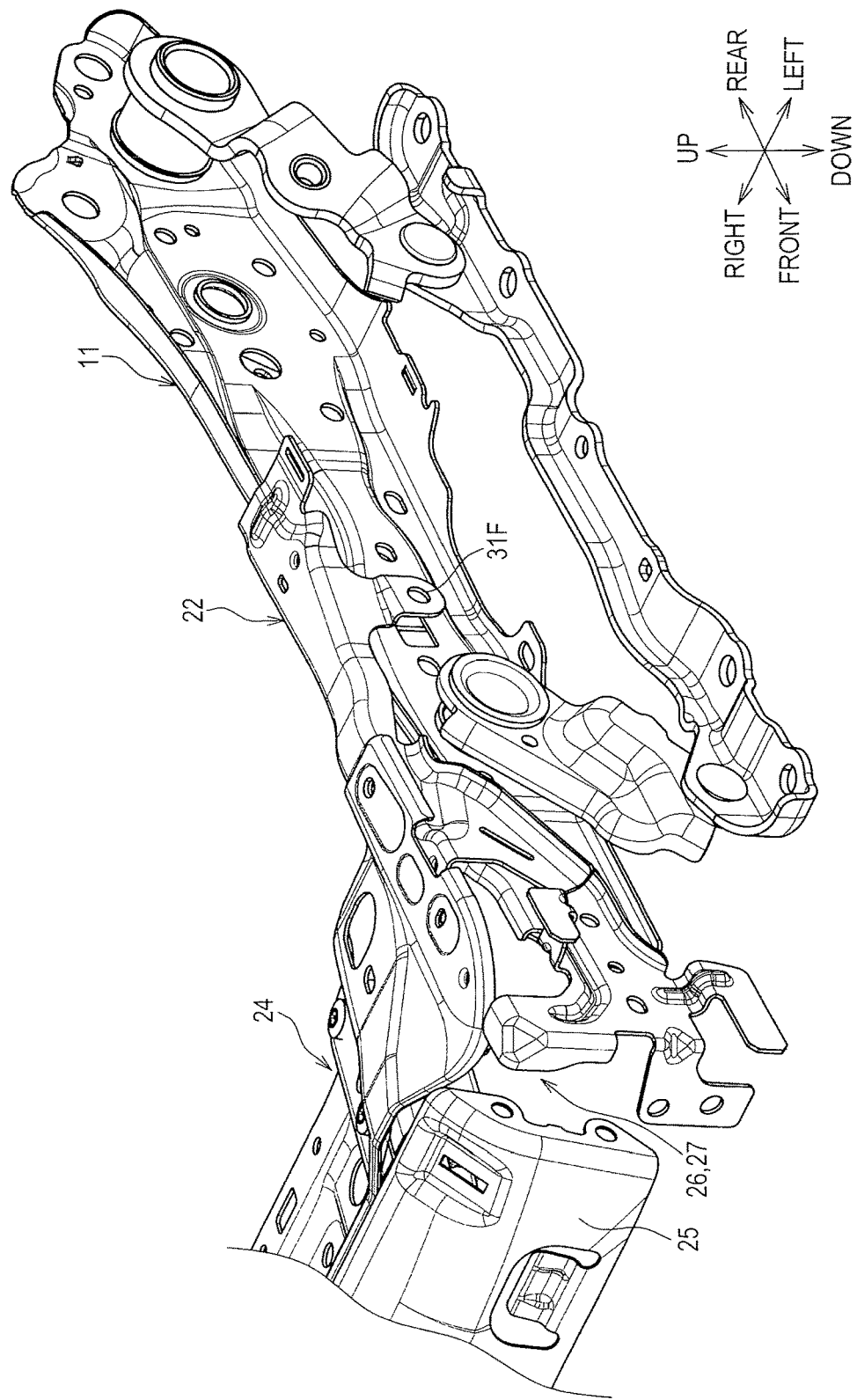
FIG. 6 is an enlarged perspective view of the displacement mechanism and so on according to one embodiment.

The third protrusion 31C is a protruding portion that protrudes in the seat width direction from the front-side shield portion 31 toward the tilt arm 22. The third protrusion 31C is fitted into a fitting hole 31F (see FIG. 6) arranged in the tilt arm 22.

3. Characteristics of Vehicle Seat According to the Present Embodiment 3.1 Supporting Structure for Front-Side Shield Portion In the present embodiment, the planar support portion 27 is provided that is in surface contact with each of the side pad portions 19B and 19C to support the side pad portions 19B and 19C. This makes it possible, for example, to reliably support the corresponding side pad portion as compared to a linear supporting structure in which each of the side pad portions 19B and 19C is supported by a wire-shaped member.

Specifically, in the linear supporting structure in which each of the side pad portions 19B and 19C is supported by the wire-shaped member, the wire-shaped member and each of the side pad portions 19B and 19C are in linear contact with each other. Thus, when the moment centering on the wire-shaped member acts on each of the side pad portions 19B and 19C, there is a risk that the side pad portions 19B and 19C may be rotationally displaced in a rolling manner.

In contrast, in the present embodiment, such rotational displacement of the side pad portions 19B and 19C in a rolling manner can be inhibited even when the moment acts on the side pad portions 19B and 19C because the planar support portion 27 is in contact with each of the side pad portions 19B and 19C over a larger area than in the linear supporting structure. Accordingly, the side pad portions 19B and 19C can be reliably supported.

The planar support portion 27 comprises the first receiving surface 27A, which is in surface contact with each of the side pad portions 19B and 19C so as to be able to receive the load applied in the vertical direction. This makes it possible to reliably receive the load applied in the vertical direction.

The planar support portion 27 comprises the second receiving surface 27B, which is in surface contact with each of the side pad portions 19B and 19C so as to be able to receive the load applied in the seat front-rear direction. This makes it possible to reliably support each of the side pad portions 19B and 19C.

The planar support portion 27 comprises the third receiving surface 27C, which is in surface contact with each of the side pad portions 19B and 19C so as to be able to receive the load applied in the seat width direction. This makes it possible to support each of the side pad portions 19B and 19C more reliably.

In the case where the side pad portions 19B and 19C are respectively provided on the seat width direction inner side and the seat width direction outer side, the outer receiving surface 27L comes in surface contact with the outer pad 19C from the first end side in the seat width direction. Similarly, the inner receiving surface 27R comes in surface contact with the inner pad 19B from the first end side in the seat width direction.

With such a configuration, the side pad portions 19B and 19C can be reliably supported even when, in particular, force directed from the second end side toward the first end side in the seat width direction acts on the cushion pad 19.

Specifically, since the vehicle seat 1 according to the present embodiment is the front seat on the left side, the occupant to get in the vehicle moves from the vehicle left side to the vehicle right side to sit on the vehicle seat 1. Thus, the seat cushion 3 including the side pad portions 19B and 19C is subjected to the load directed from the vehicle left side to the vehicle right side.

To cope with this, in the present embodiment, the outer receiving surface 27L comes in surface contact with the outer pad 19C from the right side (inner side), and the inner receiving surface 27R comes in surface contact with the inner pad 19B also from the right side (inner side), and thus, the side pad portions 19B and 19C can be reliably supported against the above-described load.

3.2 Supporting Structure for Shield

In the present embodiment, the inserting-direction length L1 of the portion of the first protrusion 31D inserted into the first insertion hole 31A is longer than the inserting-direction length L2 of the portion of the second protrusion 31E inserted into the second insertion hole 31B.

This makes it possible, in the present embodiment, for an assembly worker or an automatic assembly device (hereinafter referred to as a worker or the like) to mount the front-side shield portion 31 to the cushion frame 9 by inserting the first protrusion 31D and the second protrusion 31E respectively into the first insertion hole 31A and the second insertion hole 31B. Since the first protrusion 31D and the second protrusion 31E extend in a direction intersecting with the seat width direction, the front-side shield portion 31 can be inhibited from falling off in the seat width direction.

In a case of a vehicle seat in which, for example, a fixing portion corresponding to the second protrusion is configured with the wire-shaped member and in which a fixed portion corresponding to the second insertion hole is configured with a catching portion that catches the wire-shaped member (hereinafter referred to as a wire method), assemblability is poor, and thus, reduction of man-hours is difficult.

Specifically, in the wire method, the worker or the like needs to cause a shield to be warped such that the shield is rotated about the first protrusion side after the first protrusion is inserted into the first insertion hole to thereby cause the wire-shaped member to be caught by the catching portion. That is, in the wire method, reduction of man-hours is difficult because different kinds of assembly works, such as an insertion work and a catching work, are required.

In contrast, in the present embodiment, the worker or the like can insert and mount the first protrusion 31D and the second protrusion 31E respectively into the first insertion hole 31A and the second insertion hole 31B by moving the front-side shield portion 31 in a single direction, that is, in the direction intersecting with the seat width direction, with respect to the cushion frame 9 (each of the tilt arms 22 and 23).

Accordingly, in the vehicle seat 1 according to the present embodiment, reduction of man-hours is enabled while inhibiting the front-side shield portion 31 from falling off in the seat width direction.

In the present embodiment, the first protrusion 31D and the second protrusion 31E protrude in the seat front-rear direction. This makes it possible to insert and mount the first protrusion 31D and the second protrusion 31E respectively into the first insertion hole 31A and the second insertion hole 31B by moving the front-side shield portion 31 in the seat front-rear direction (in the present embodiment, toward the seat rear side) with respect to the cushion frame 9.

In the present embodiment, the second protrusion 31E protrudes in the same direction as the first protrusion 31D, that is, toward the seat front side. Thus, the first protrusion 31D and the second protrusion 31E can be easily inserted and mounted by moving the front-side shield portion 31 toward the seat rear side with respect to the cushion frame 9.

In the present embodiment, the first protrusion 31D is provided lower than the second protrusion 31E. This makes it possible to fix the front-side shield portion 31 reliably even when the moment centering on a rotation axis directed in the seat front-rear direction acts on the front-side shield portion 31.

In the present embodiment, the cushion frame 9 comprises the tilt arms 22 and 23. Moreover, the first protrusion 31D and the second protrusion 31E are provided to each of the tilt arms 22 and 23, and protrude from the rear side to the front side in the seat front-rear direction. Furthermore, the front-side shield portion 31 comprises the first insertion hole 31A and the second insertion hole 31B, and moves in a pivoting manner integrally with each of the tilt arms 22 and 23.

With the above-described configuration, design property (good appearance) of the front-side shield portion 31 can be inhibited from being damaged because the front-side shield portion 31 can be displaced correspondingly to the pivoting movement of each of the tilt arms 22 and 23.

3.3 Structure of Tilt Arm

Each of the tilt arms 22 and 23 according to the present embodiment is configured with the coupling arm portion 22A and the leading-end-side arm portion 22B coupled and fixed to each other. Thus, the tilt arms 22 and 23 can be formed relatively easily regardless of the complexity of their shapes because the coupling arm portion 22A and the leading-end-side arm portion 22B can be formed separately from each other.

In the present embodiment, the fixed portion 22D, where the coupling arm portion 22A and the leading-end-side arm portion 22B are coupled and fixed to each other, has the closed sectional shape, and thus, flexural rigidity and torsional rigidity of the tilt arms 22 and 23 can be improved. Accordingly, in the present embodiment, the tilt arms 22 and 23 each having a complex shape can be formed relatively easily while achieving improvement in the rigidity of the tilt arms 22 and 23.

In the present embodiment, the overlapping direction D1 at the first portion WP1 is a direction intersecting with the overlapping direction D2 at the second portion WP2. This makes it possible to reliably improve the rigidity of the fixed portion 22D as compared to a case in which the overlapping directions at such two portions are parallel to each other.

In the present embodiment, the overlapping direction D1 at the first portion WP1 is substantially parallel to the seat width direction, and the overlapping direction D2 at the second portion WP2 is substantially parallel to the vertical direction. This makes it possible to improve the rigidity of the fixed portion 22D more reliably.

In the present embodiment, the lower end position 22E at the leading end portion of the leading-end-side arm portion 22B is positioned vertically lower than the lower end position 22F at the fixed portion 22D. In the thus-configured tilt arm, the fixed portion 22D is easily subjected to a large torsional moment.

However, in the present embodiment, the fixed portion 22D, where the coupling arm portion 22A and the leading-end-side arm portion 22B are coupled and fixed to each other, has the closed sectional shape, and thus, the torsional rigidity of the tilt arms 22 and 23 can be improved to thereby make it possible to adequately counteract the above-described torsional moment.

OTHER EMBODIMENTS

The vehicle seat 1 according to the above-described embodiment can also be applied to, for example, a vehicle seat comprising at least one of the tilt function, the ottoman function, and the cushion length changeable function, or to a vehicle seat not comprising the displacement mechanism 21.

The vehicle seat 1 according to the above-described embodiment need not, for example, comprise the planar support portion 27, and each of the side pad portions 19B and 19C may be supported by a linear support portion.

The vehicle seat 1 according to the above-described embodiment may, for example, comprise any one or any two of the first receiving surface 27A to the third receiving surface 27C.

The vehicle seat 1 according to the above-described embodiment may, for example, comprise: (1) a configuration in which the outer receiving surface 27L comes in surface contact with the outer pad 19C from the left side (outer side), and in which the inner receiving surface 27R comes in surface contact with the inner pad 19B also from the left side (outer side); or (2) a configuration in which the outer receiving surface 27L comes in surface contact with the outer pad 19C from the right side (inner side), and in which the inner receiving surface 27R comes in surface contact with the inner pad 19B from the left side (outer side).

In the vehicle seat 1 according to the above-described embodiment, the support member 26 may, for example, be provided more on the seat rear side than the leading end portion of each of the tilt arms 22 and 23.

In the vehicle seat 1 according to the above-described embodiment, the front-side shield portion 31 (the side shield 33) may, for example, be mounted by the above-described wire method.

The vehicle seat 1 according to the above-described embodiment may, for example, comprise: (1) a configuration in which the first protrusion 31D and the second protrusion 31E are provided to the front-side shield portion 31, and in which the first insertion hole 31A and the second insertion hole 31B are provided to each of the tilt arms 22 and 23; or (2) a configuration in which the first protrusion 31D and the second insertion hole 31B are provided to each of the tilt arms 22 and 23, and in which the first insertion hole 31A and the second protrusion 31E are provided to the front-side shield portion 31.

The vehicle seat 1 according to the above-described embodiment may, for example, comprise: (1) a configuration in which the first protrusion 31D and the second protrusion 31E protrude toward the seat rear side, or (2) a configuration in which the first protrusion 31D and the second protrusion 31E protrude in the vertical direction.

The vehicle seat 1 according to the above-described embodiment may, for example, comprise the side shield 33 configured with one shield portion or three or more shield portions.

The vehicle seat 1 according to the above-described embodiment may, for example, comprise the tilt arms 22 and 23 each integrally formed of a single member.

In the above-described embodiment, at the fixed portion 22D, the first plate member P1 constituting the coupling arm portion 22A and the second plate member P2 constituting the leading-end-side arm portion 22B are coupled and fixed to each other so as to overlap with each other in the plate thickness direction at the at least two portions. However, the present disclosure is not limited to this.

In the above-described embodiment, the overlapping direction D1 at the first portion WP1 is a direction intersecting with the overlapping direction D2 at the second portion WP2. However, the present disclosure is not limited to this.

In the above-described embodiment, the overlapping direction D1 at the first portion WP1 is substantially parallel to the seat width direction, and the overlapping direction D2 at the second portion WP2 is substantially parallel to the vertical direction. However, the present disclosure is not limited to this.

In the above-described embodiment, as shown in FIG. 8A, the lower end position 22E at the leading end portion of the leading-end-side arm portion 22B is positioned vertically lower than the lower end position 22F at the fixed portion 22D. However, the present disclosure is not limited to this.

The above-described embodiment is directed to a front seat of an ordinary passenger car. However, application of the present disclosure is not limited to this, and the present disclosure can also be applied to seats for other motor vehicles, or seats used for vehicles, such as a railway vehicle, a ship, and an aircraft.

Further, the present disclosure is not limited to the above-described embodiments as long as the present disclosure conforms to the gist of the disclosure recited in the claims. Accordingly, a configuration may be employed that is a combination of at least two of the above-described embodiments.

What is claimed is:

1. A tilt arm for a seat to be applied to a vehicle seat, the tilt arm supporting a cushion pad together with a cushion frame and movable in a pivoting manner when changing an angle of inclination of a front end portion of the cushion pad, the tilt arm comprising:
   a coupling arm portion pivotably coupled to a side frame of the cushion frame; and
   a leading-end-side arm portion coupled and fixed to a leading end portion of the coupling arm portion at a fixed portion of the tilt arm, wherein
   a first plate member constitutes the coupling arm portion and a second plate member constitutes the leading-end-side arm portion,
   in a side view of the tilt arm, the coupling arm portion and the leading-end-side arm portion are coupled and fixed to each other at the fixed portion so as to overlap with each other in a plate thickness direction at at least two portions such that a space is defined between the coupling arm portion and the leading-end-side arm portion, and
   the at least two portions comprise a first portion and a second portion, and an overlapping direction at the first portion is a direction intersecting with an overlapping direction at the second portion.

2. The tilt arm for a seat according to claim 1, wherein the overlapping direction at the first portion is substantially parallel to a seat width direction, and the overlapping direction at the second portion is substantially parallel to a vertical direction.

3. The tilt arm for a seat according to claim 1, wherein a lower end position at a leading end portion of the leading-end-side arm portion is positioned vertically lower than a lower end position of the leading-end-side arm at the fixed portion.

4. A vehicle seat comprising:
   a cushion pad comprising:
      a seating face pad portion to support buttocks of an occupant; and
      a side pad portion provided to a portion adjacent to the seating face pad portion in a seat width direction;
   a displacement mechanism that comprises the tilt arm according to claim 3 and that causes a seat front end portion of the seating face pad portion to be displaced; and
   a support member to support a seat front end portion of the side pad portion, the support member comprising a planar support portion that is in surface contact with the side pad portion to support the side pad portion.

5. The vehicle seat according to claim 4, wherein the planar support portion comprises a first receiving surface configured to be in surface contact with the side pad portion so as to be able to receive a load applied in a vertical direction.

6. The vehicle seat according to claim 4, wherein the planar support portion comprises a second receiving surface configured to be in surface contact with the side pad portion so as to be able to receive a load applied in a seat front-rear direction.

7. The vehicle seat according to claim 4, wherein the planar support portion comprises a third receiving surface configured to be in surface contact with the side pad portion so as to be able to receive a load applied in the seat width direction.

8. The vehicle seat according to claim 4,
wherein the side pad portion comprises:
an outer pad positioned on a seat width direction outer side of the seating face pad portion; and
an inner pad positioned on a seat width direction inner side of the seating face pad portion,
wherein the planar support portion comprises:
an outer support portion in surface contact with the outer pad; and
an inner support portion in surface contact with the inner pad,
wherein the outer support portion comprises an outer receiving surface configured to be in surface contact with the outer pad so as to be able to receive a load applied in the seat width direction,
wherein the inner support portion comprises an inner receiving surface configured to be in surface contact with the inner pad so as to be able to receive the load applied in the seat width direction, and
wherein the outer receiving surface comes in surface contact with the outer pad from a first end side in the seat width direction, and the inner receiving surface comes in surface contact with the inner pad from the first end side in the seat width direction.

9. The vehicle seat according to claim 4,
wherein the support member is provided to a leading end portion of the tilt arm.

10. The vehicle seat according to claim 9 comprising:
a cushion frame to support the cushion pad;
a shield that is supported by the cushion frame and that covers at least part of a side of the cushion frame;
a first protrusion that is provided to the cushion frame and that protrudes in a direction intersecting with the seat width direction, the first protrusion being inserted into a first insertion hole arranged to the shield; and
a second protrusion that is provided to the cushion frame and that protrudes in a direction parallel to the first protrusion, the second protrusion being inserted into a second insertion hole arranged to the shield,
wherein an inserting-direction length of a portion of the first protrusion inserted into the first insertion hole is longer than an inserting-direction length of a portion of the second protrusion inserted into the second insertion hole.

11. The vehicle seat according to claim 10,
wherein the first protrusion and the second protrusion each protrude in the seat front-rear direction.

12. The vehicle seat according to claim 11,
wherein the second protrusion protrudes in a same direction as the first protrusion.

13. The vehicle seat according to claim 10,
wherein the first protrusion is provided lower than the second protrusion.

14. The vehicle seat according to claim 13,
wherein the first protrusion and the second protrusion are provided to the tilt arm for a seat and protrude in a direction from a rear side toward a front side in the seat front-rear direction, and wherein the shield comprises:
a front-side shield portion that comprises the first insertion hole and the second insertion hole and that moves in a pivoting manner integrally with the tilt arm for a seat; and
a rear-side shield portion fixed to the cushion frame.

15. The vehicle seat according to claim 9 comprising:
a cushion frame to support the cushion pad;
a shield that is supported by the cushion frame and that covers at least part of a side of the cushion frame;
a first protrusion that is provided to the shield and that protrudes in a direction intersecting with the seat width direction, the first protrusion being inserted into a first insertion hole arranged to the cushion frame; and
a second protrusion that is provided to the shield and that protrudes in a direction parallel to the first protrusion, the second protrusion being inserted into a second insertion hole arranged to the cushion frame,
wherein an inserting-direction length of a portion of the first protrusion inserted into the first insertion hole is longer than an inserting-direction length of a portion of the second protrusion inserted into the second insertion hole.

16. The vehicle seat according to claim 9 comprising:
a cushion frame to support the cushion pad;
a shield that is supported by the cushion frame and that covers at least part of a side of the cushion frame;
a first protrusion that is provided to the cushion frame and that protrudes in a direction intersecting with the seat width direction, the first protrusion being inserted into a first insertion hole arranged to the shield; and
a second protrusion that is provided to the shield and that protrudes in a direction parallel to the first protrusion, the second protrusion being inserted into a second insertion hole arranged to the cushion frame,
wherein an inserting-direction length of a portion of the first protrusion inserted into the first insertion hole is longer than an inserting-direction length of a portion of the second protrusion inserted into the second insertion hole.

17. The vehicle seat according to claim 9 comprising:
a cushion frame to support the cushion pad;
a shield that is supported by the shield and that covers at least part of a side of the cushion frame;
a first protrusion that is provided to the shield and that protrudes in a direction intersecting with the seat width direction, the first protrusion being inserted into a first insertion hole arranged to the cushion frame; and
a second protrusion that is provided to the cushion frame and that protrudes in a direction parallel to the first protrusion, the second protrusion being inserted into a second insertion hole arranged to the shield,
wherein an inserting-direction length of a portion of the first protrusion inserted into the first insertion hole is longer than an inserting-direction length of a portion of the second protrusion inserted into the second insertion hole.

* * * * *